US010428748B2

(12) United States Patent
Sase et al.

(10) Patent No.: US 10,428,748 B2
(45) Date of Patent: Oct. 1, 2019

(54) CONTROL DEVICE FOR SUPERCHARGING SYSTEM

(71) Applicant: MITSUBISHI HEAVY INDUSTRIES, LTD., Tokyo (JP)

(72) Inventors: Ryo Sase, Tokyo (JP); Yukio Yamashita, Tokyo (JP); Ko Takayanagi, Tokyo (JP); Atsushi Matsuo, Tokyo (JP); Rikikazu Hayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 411 days.

(21) Appl. No.: 15/100,846

(22) PCT Filed: Dec. 1, 2014

(86) PCT No.: PCT/JP2014/081723
§ 371 (c)(1),
(2) Date: Jun. 1, 2016

(87) PCT Pub. No.: WO2015/083658
PCT Pub. Date: Jun. 11, 2015

(65) Prior Publication Data
US 2016/0305353 A1 Oct. 20, 2016

(30) Foreign Application Priority Data

Dec. 4, 2013 (JP) .................................. 2013-251250
Nov. 21, 2014 (JP) .................................. 2014-236571

(51) Int. Cl.
*F02D 41/00* (2006.01)
*F02B 37/013* (2006.01)
(Continued)

(52) U.S. Cl.
CPC ........ *F02D 41/0007* (2013.01); *F02B 37/013* (2013.01); *F02B 37/04* (2013.01);
(Continued)

(58) Field of Classification Search
CPC .... F02D 41/0007; F02B 37/013; F02B 37/04; F02B 37/12; F02B 37/18
(Continued)

(56) References Cited

U.S. PATENT DOCUMENTS

| 4,756,377 A | 7/1988 | Kawamura et al. |
| 4,774,811 A | 10/1988 | Kawamura |

(Continued)

FOREIGN PATENT DOCUMENTS

| CN | 1360714 A | 7/2002 |
| CN | 101105429 A | 1/2008 |

(Continued)

OTHER PUBLICATIONS

International Search Report and Written Opinion of the International Searching Authority (Forms PCT/ISA/210, PCT/ISA/220 and PCT/ISA/237), dated Feb. 3, 2015, for International Application No. PCT/JP2014/079634.

(Continued)

*Primary Examiner* — Ngoc T Nguyen
(74) *Attorney, Agent, or Firm* — Birch, Stewart, Kolasch & Birch, LLP

(57) ABSTRACT

A control device (10) for a supercharging system for supplying compressed intake air to an engine (6) includes: an engine controller (10A) including an engine signal input part (10A1) and an engine control part (10A2) configured to control an operational state of the engine and to compute a target boost pressure of a supercharger (4); and a turbo controller (10B2) including a turbo signal input part (10B1) and a turbo control part (10B2) configured to compute a
(Continued)

margin of the supercharger. The control device is configured to compute a target boost-pressure corrected value by correcting the target boost pressure in accordance with a magnitude of the margin computed by the turbo control part, and to control a boost-pressure control unit (12) so that the boost pressure of the supercharger reaches the target boost-pressure corrected value.

13 Claims, 22 Drawing Sheets

(51) Int. Cl.
- F02B 37/04 (2006.01)
- F02B 37/18 (2006.01)
- F02D 41/14 (2006.01)
- F02D 41/32 (2006.01)
- F02B 37/12 (2006.01)
- F02D 41/30 (2006.01)
- F02B 39/16 (2006.01)

(52) U.S. Cl.
CPC .............. *F02B 37/12* (2013.01); *F02B 37/18* (2013.01); *F02D 41/1401* (2013.01); *F02D 41/1446* (2013.01); *F02D 41/30* (2013.01); *F02D 41/32* (2013.01); *F02B 2037/122* (2013.01); *F02B 2037/125* (2013.01); *F02B 2039/168* (2013.01); *F02D 2041/141* (2013.01); *F02D 2200/0406* (2013.01); *Y02T 10/144* (2013.01); *Y02T 10/16* (2013.01)

(58) Field of Classification Search
USPC .................................. 60/602, 612; 123/562
See application file for complete search history.

(56) References Cited

U.S. PATENT DOCUMENTS

| | | |
|---|---|---|
| 4,884,407 A | 12/1989 | Hatanaka |
| 5,645,033 A | 7/1997 | Person et al. |
| 5,873,248 A * | 2/1999 | Houtz .................. F02B 37/013 60/602 |
| 6,089,018 A | 7/2000 | Bischoff et al. |
| 6,209,390 B1 | 4/2001 | LaRue et al. |
| 8,051,661 B2 | 11/2011 | Igarashi et al. |
| 8,584,460 B2 | 11/2013 | Mårdberg Jozsa et al. |
| 8,813,494 B2 | 8/2014 | Hofer et al. |
| 2003/0005695 A1* | 1/2003 | Allen ..................... F02B 37/10 60/608 |
| 2003/0145591 A1* | 8/2003 | Arnold ................... F01D 17/14 60/602 |
| 2004/0139809 A1 | 7/2004 | Soechting et al. |
| 2004/0187495 A1 | 9/2004 | Ando et al. |
| 2005/0193810 A1 | 9/2005 | Gladden |
| 2006/0021344 A1 | 2/2006 | Barba et al. |
| 2006/0026960 A1 | 2/2006 | Butscher et al. |
| 2006/0113799 A1 | 6/2006 | Obayashi et al. |
| 2006/0196182 A1* | 9/2006 | Kimoto .................. F02B 33/44 60/605.1 |
| 2006/0287795 A1 | 12/2006 | Samad et al. |
| 2007/0033938 A1* | 2/2007 | Ueno ..................... F02B 37/004 60/612 |
| 2008/0047268 A1 | 2/2008 | Isogai et al. |
| 2009/0107140 A1* | 4/2009 | Pursifull .............. B60W 10/10 60/600 |
| 2009/0132153 A1* | 5/2009 | Shutty .................. F01N 11/002 701/108 |
| 2009/0222190 A1 | 9/2009 | Andreae et al. |
| 2009/0287448 A1 | 11/2009 | Brown et al. |
| 2009/0299609 A1 | 12/2009 | Gokhale |
| 2011/0192161 A1 | 8/2011 | Takahaski et al. |
| 2011/0288744 A1 | 11/2011 | Gokhale et al. |
| 2013/0167810 A1 | 7/2013 | Roplekar et al. |
| 2013/0227944 A1 | 9/2013 | Denholm et al. |
| 2015/0037178 A1 | 2/2015 | Wang |
| 2015/0122234 A1 | 5/2015 | Tanaka |
| 2015/0285122 A1 | 10/2015 | Yamashita et al. |
| 2016/0265468 A1* | 9/2016 | Takayanagi ........... F02B 37/013 |
| 2017/0002726 A1 | 1/2017 | Iwamoto |

FOREIGN PATENT DOCUMENTS

| | | |
|---|---|---|
| CN | 101424211 A | 5/2009 |
| CN | 101273385 B | 5/2010 |
| CN | 102177323 A | 9/2011 |
| CN | 102418610 A | 4/2012 |
| EP | 2 317 082 A2 | 5/2011 |
| EP | 2434123 A1 | 3/2012 |
| JP | 58-53643 A | 3/1983 |
| JP | 59-52139 U | 4/1984 |
| JP | 61-38127 U | 3/1986 |
| JP | 62-210222 A | 9/1987 |
| JP | 64-32019 A | 2/1989 |
| JP | 5-33688 A | 2/1993 |
| JP | 5-280365 A | 10/1993 |
| JP | 6-323158 A | 11/1994 |
| JP | 6-341325 A | 12/1994 |
| JP | 7-150990 A | 6/1995 |
| JP | 8-326555 A | 12/1996 |
| JP | 9-329032 A | 12/1997 |
| JP | 10-159576 A | 6/1998 |
| JP | 2000-179348 A | 6/2000 |
| JP | 2000-356158 A | 12/2000 |
| JP | 2001-342840 A | 12/2001 |
| JP | 2002-188474 A | 7/2002 |
| JP | 2002-544443 A | 12/2002 |
| JP | 2003-227362 A | 8/2003 |
| JP | 2003-269183 A | 9/2003 |
| JP | 2004-27897 A | 1/2004 |
| JP | 2004-251203 A | 9/2004 |
| JP | 2005-83317 A | 3/2005 |
| JP | 2005-155384 A | 6/2005 |
| JP | 2005-248952 A | 9/2005 |
| JP | 2005-351129 A | 12/2005 |
| JP | 2006-63873 A | 3/2006 |
| JP | 2006-188989 A | 7/2006 |
| JP | 2006-207506 A | 8/2006 |
| JP | 2006-242462 A | 9/2006 |
| JP | 2006-242487 A | 9/2006 |
| JP | 2007-32860 A | 2/2007 |
| JP | 2007-206007 A | 8/2007 |
| JP | 2008-45410 A | 2/2008 |
| JP | 2008-175126 A | 7/2008 |
| JP | 2008-544144 A | 12/2008 |
| JP | 4209350 B2 | 1/2009 |
| JP | 2010-14122 A | 1/2010 |
| JP | 4415912 B2 | 2/2010 |
| JP | 2010-180710 A | 8/2010 |
| JP | 2010-190145 A | 9/2010 |
| JP | 2011-247181 A | 12/2011 |
| JP | 2011-256743 A | 12/2011 |
| JP | 2012-7544 A | 1/2012 |
| JP | 2012-52508 A | 3/2012 |
| JP | 2013-19319 A | 1/2013 |
| JP | 2013-127221 A | 6/2013 |
| JP | 2013-133776 A | 7/2013 |
| JP | 2013-185441 A | 9/2013 |
| JP | 2013-217382 A | 10/2013 |
| JP | 2014-84772 A | 5/2014 |
| WO | WO 00/70562 A1 | 11/2000 |
| WO | WO 03/071111 A1 | 8/2003 |
| WO | WO 2006/138545 A1 | 12/2006 |
| WO | WO 2007/055094 A1 | 5/2007 |
| WO | WO 2007/141613 A1 | 12/2007 |
| WO | WO 2013/004595 A1 | 1/2013 |

(56) References Cited

FOREIGN PATENT DOCUMENTS

WO     WO 2013/066529 A1     5/2013
WO     WO 2013/157126 A1     10/2013

OTHER PUBLICATIONS

International Search Report and Written Opinion of the International Searching Authority (Forms PCT/ISA/210, PCT/ISA/220 and PCT/ISA/237), dated Jan. 27, 2015, for International Application No. PCT/JP2014/081384.
International Search Report and Written Opinion of the International Searching Authority (Forms PCT/ISA/210, PCT/ISA/220 and PCT/ISA/237), dated Mar. 3, 2015, for International Application No. PCT/JP2014/081381.
International Search Report and Written Opinion of the International Searching Authority (Forms PCT/ISA/210, PCT/ISA/220 and PCT/ISA/237), dated Mar. 3, 2015, for International Application No. PCT/JP2014/081387.
International Search Report and Written Opinion of the International Searching Authority (Forms PCT/ISA/210, PCT/ISA/220 and PCT/ISA/237), dated Mar. 3, 2015, for International Application No. PCT/JP2014/081723.
Extended European Search Report, dated Jul. 1, 2016, for European Application No. 14868701.5.
Extended European Search Report dated Nov. 4, 2016 in corresponding EP Application No. 14868295.8.
Extended European Search Report dated Jan. 10, 2017 issued in the corresponding EP Application No. 14867944.2.
Partial Supplementary European Search Report, dated Feb. 28, 2017, for European Application No. 14868535.7.
Partial Supplementary European Search Report, dated Mar. 2, 2017, for European Application No. 14867002.9.
Office Action dated May 31, 2017, issued to the corresponding Chinese Application No. 201480051228.1 with an English Translation.
Extended European Search Report dated Jun. 8, 2017 issued to the corresponding EP Application No. 14867002.9.
Extended European Search Report dated Jun. 8, 2017 issued to the corresponding EP Application No. 14868535.7.
Chinese Office Action and Search Report, dated Aug. 3, 2017, for Chinese Application No. 201480051852.1, with an English translation of the Office Action.
Chinese Office Action and Search Report, dated Aug. 7, 2017, for Chinese Application No. 201480050503.8, with an English translation of the Office Action.
Chinese Office Action and Search Report for Chinese Application No. 201480060612.8, dated Sep. 5, 2017, with an English translation of the Office Action.
Japanese Notification of Reasons for Refusal for Japanese Application No. 2013-251248, dated Sep. 1, 2017, with an English translation.
US Office Action for U.S. Appl. No. 15/024,642, dated Sep. 15, 2017.
Chinese Office Action and Search Report for Chinese Application No. 201480065709.8, dated Nov. 3, 2017, with English translation of the Office Action.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/079634, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081381, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081384, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081387, together with an English translation thereof.
International Preliminary Report on Patentability and Written Opinion of the International Searching Authority (Forms PCT/IB/338, PCT/IB/373, PCT/ISA/237 and PCT/IB/326), dated Jun. 16, 2016, for International Application No. PCT/JP2014/081723, together with an English translation thereof.
Chinese Office Action, dated Jun. 26, 2018, for Chinese Application No. 201480060612.8, with an English translation.
Japanese Office Action, dated Jun. 29, 2018, for Japanese Application No. 2014-236571, with an English translation.

* cited by examiner (a) 12A, 12B ARE FULLY CLOSED
(b) CONTROL BOOST PRESSURE WITH 12A
(c) CONTROL BOOST PRESSURE WITH 12B

CONTROL DEVICE FOR SUPERCHARGING SYSTEM

TECHNICAL FIELD

The present disclosure relates to a control device for a supercharging system for supplying compressed intake air to an engine.

BACKGROUND ART

As a technique to improve an output of an engine, a method (supercharging) of compressing intake air with a supercharger and supplying an engine with the compressed intake air is known, and widely used in an engine for an automobile and the like. A supercharger may transitionally enter an abnormal operational state with surging, over-speed, or the like, depending on the operational state of the supercharger. Such abnormal operation may lead to breakage of various devices, and thus needs to be prevented as much as possible.

Patent Document 1 discloses an invention, as a control device for a turbocharger, for suppressing surging by predicting occurrence of surging from an operational state of the turbocharger and opening a waste-gate valve immediately before occurrence of surging to reduce a flow rate of exhaust gas flowing to a turbine.

Patent Document 2 discloses an invention, as a supercharging control device, for suppressing surging by providing a compressor-bypass valve for returning intake air from a downstream side toward an upstream side of a compressor and opening the bypass valve to return intake air if occurrence of surging is predicted.

Patent Document 3 discloses an invention, as a control device for a variable geometry turbocharger, for suppressing over-speed by changing a vane angle of nozzle vanes to achieve the maximum nozzle area during over-speed of a turbocharger.

CITATION LIST

Patent Literature

Patent Document 1: JP2004-27897A
Patent Document 2: JP2006-207506A
Patent Document 3: JPH5-280365A

SUMMARY

Problems to be Solved

The inventions disclosed in Patent Documents 1 to 3 described above are basically intended to determine whether an operational point is within a surge region in which surging may occur, and to control various devices for controlling a boost pressure to reduce the boost pressure if the operational point is within the surge region. Such conventional techniques control various devices to be switched alternatively on the basis of whether an operational point is within the surge region, and thus a boost pressure may rapidly change. Further, the invention disclosed in Patent Document 2 requires additional provision of a compressor-bypass valve, which makes a supercharger larger in size and more complicated.

Further, in accordance with the improvement of the engines in recent years, the control logic and hardware configuration of an engine controller is becoming increasingly complicated. In this context, the techniques disclosed in the above Patent Documents 1 to 3 have a problem of increasingly complicated control logic and hardware of an engine controller, because functions for preventing surging are installed on the engine controller. Further, if a quickly-changing transitional phenomenon like surging is to be controlled by an engine controller with complicated control logic and hardware configuration, communication delay of the engine controller may be a problem.

At least one embodiment of the present invention was made in view of the above conventional problem, and an object of at least one embodiment is to provide a control device for a supercharging system capable of preventing occurrence of surging in advance while suppressing rapid fluctuation of a boost pressure, and of controlling the boost pressure quickly while avoiding an influence from communication delay.

Solution to the Problems

In an embodiment of the present invention, a control device for a supercharging system for supplying compressed intake air to an engine, the supercharging system comprising a supercharger configured to compress intake air to be supplied to the engine, a boost-pressure control unit configured to control a boost pressure of the supercharger, and a control device configured to control the boost-pressure control unit, comprises: an engine controller comprising an engine signal input part to which various sensor signals related to an operational state of the engine are to be inputted, and an engine control part configured to control an operational state of the engine and to compute a target boost pressure of the supercharger on the basis of the sensor signals inputted into the engine signal input part; and a turbo controller comprising a turbo signal input part to which at least sensor signals related to an operational state of the supercharger are to be inputted from among the various sensor signals related to an operational state of the engine, and a turbo control part configured to compute a margin of the supercharger on the basis of the sensor signals inputted to the turbo signal input part, the turbo controller comprising a control part and a signal input part provided separately and independently from the engine controller. The control device is configured to compute a target boost-pressure corrected value by correcting the target boost pressure in accordance with a magnitude of the margin computed by the turbo control part, and to control the boost-pressure control unit so that the boost pressure of the supercharger reaches the target boost-pressure corrected value.

The above control device of the supercharging system computes a target boost-pressure corrected value by using a margin (surge margin), which is a numeral index representing a margin with respect to surging, and correcting a target boost pressure in accordance with the magnitude of the margin. The boost-pressure control unit is controlled so that the boost pressure of the supercharger reaches a target boost-pressure corrected value. With the above control device of the supercharging system, the control amount of the boost-pressure control unit changes in accordance with the magnitude of the margin. Thus, it is possible to prevent surging in advance while reducing rapid fluctuation of a boost pressure, as compared to a typical case in which the boost-pressure control unit is switched alternatively on the basis of whether an operational point is in the surge region.

Further, the control device of the supercharging system includes the turbo controller including a control part and a signal input part provided separately and independently from the engine controller. The turbo controller is a controller which basically controls only the supercharger, unlike the engine controller, which simultaneously controls a plurality of devices. Thus, with the turbo control part of the turbo controller computing a margin, it is possible to compute a margin quickly and accurately. Accordingly, it is possible to control a boost pressure quickly while avoiding an influence from communication delay which may take place if a margin is computed by the engine controller.

In some embodiments, the engine controller is configured to compute the target boost-pressure corrected value by correcting the target boost pressure in accordance with the magnitude of the margin, compute a turbo control command value corresponding to the target boost-pressure corrected value, and output the computed turbo control command value to the boost-pressure control unit via the turbo controller. Further, the turbo controller has an autonomous protection function to re-compute a margin of the supercharger on the basis of sensor signals related to an operational state of the supercharger after the boost-pressure control unit is controlled on the basis of the turbo control command value, correct the turbo control command value in accordance with a magnitude of the re-computed margin, and output the corrected turbo control command value to the boost-pressure control unit.

In the present embodiment, basically, the engine controller computes a turbo control command value corresponding to the above described target boost-pressure corrected value, and the turbo control command value is outputted to the boost-pressure control unit to control the boost-pressure control unit. However, if the engine controller having complicated control logics and hardware configuration is to control the boost-pressure control unit, communication delay of the engine controller may be a problem, as described above. Thus, with the turbo controller having the above autonomous-protection function, it is possible to control the boost-pressure control unit with the turbo controller quickly to avoid surging more securely, if the engine controller cannot control in time or if a case where correction is so insufficient that surging cannot be avoided, for instance.

In the above embodiment, the turbo controller is configured to output the corrected turbo control command value also to the engine controller when outputting the corrected turbo control command value to the boost-pressure control unit.

According to this embodiment, if the turbo controller controls the boost-pressure control unit autonomously by the autonomous-protection function, the content of the control is transmitted also to the engine controller. Thus, the engine controller can control the boost-pressure control unit from then on, or control other devices, taking account of the transmitted content of the control. Further, the turbo controller may autonomously store execution of control of the boost-pressure control unit, which makes it possible to utilize the stored data for diagnosis of malfunction during maintenance.

In some embodiments, the engine controller is configured to output the target boost pressure computed by the engine control part to the turbo controller, and the turbo controller is configured to compute a target boost-pressure corrected value by correcting the target boost pressure on the basis of the margin computed by the turbo control part, compute a turbo control command value corresponding to the target boost-pressure corrected value, and output the computed turbo control command value to the boost-pressure control unit.

According to this embodiment, basically, a target boost-pressure corrected value is computed by the turbo controller, and a turbo control command value corresponding to the target boost-pressure corrected value is computed, and the turbo control command value is outputted to the boost-pressure control unit. Specifically, the turbo controller itself performs the entire control of the boost-pressure control unit, and does not need to communicate with the engine controller, which makes it possible to control the boost-pressure control unit quickly while avoiding an influence from communication delay of the engine controller.

In the above embodiment, the turbo controller is configured to output the computed target boost-pressure corrected value also to the engine controller.

According to this embodiment, the engine controller can reflect the target boost-pressure corrected value computed by the turbo controller to control the boost-pressure control unit from then, on or to control other devices.

In some embodiments, the margin includes a surge-pressure margin which is a ratio of a difference between a surge pressure and a boost pressure to the surge pressure, where the surge pressure is a limit pressure at which surging occurs.

As described above, a surge-pressure margin is defined as a ratio of a difference between a surge pressure and a boost pressure to the surge pressure, and thereby it is possible to prevent occurrence of surging securely and to control the boost-pressure control unit accurately.

In the above embodiment, the margin may include a rotation-speed margin in addition to the surge-pressure margin, the rotation-speed margin being defined as the smaller one of: a maximum allowable rotation-speed margin which is a ratio of a difference between a maximum allowable rotation speed of the supercharger and a rotation speed of the supercharger to the maximum allowable rotation speed; or a steady rotation-speed allowable time margin which is a ratio of a difference between a maximum allowable duration and an elapsed time of continuous excess over a steady allowable rotation speed to the maximum allowable duration, where the steady allowable rotation speed is a rotation speed of the supercharger set to be lower than the maximum allowable rotation speed, and the maximum allowable duration is a limit length of time for which the rotation speed of the supercharger is allowed to exceed the steady allowable rotation speed continuously.

According to this embodiment, the margin includes the rotation margin defined as described above in addition to the surge-pressure margin, and thereby it is possible to prevent over-speed of the supercharger along with surging. Further, with the rotation-speed margin being defined as the smaller one of the maximum allowable rotation-speed margin or the steady rotation-speed allowable time margin, the supercharger does not exceed the maximum allowable rotation speed, but is permitted to exceed the steady allowable rotation speed (rated rotation speed of the supercharger) temporarily. In this way, it is possible to perform a control such that the performance of supercharger is maximized.

In some embodiments, the engine controller is configured to correct a fuel injection amount computed on the basis of the sensor signals inputted to the engine signal input part in accordance with a magnitude of an exhaust-temperature margin defined as the smaller one of a maximum allowable temperature margin which is a ratio of a difference between a maximum allowable temperature of the supercharger and a temperature of exhaust gas flowing through an exhaust duct of the engine to the maximum allowable temperature; or a steady temperature allowable time margin which is a ratio of a difference between a maximum allowable duration and an elapsed time of continuous excess over a steady allowable temperature to the maximum allowable duration, where the steady allowable temperature is a temperature of the supercharger set to be lower than the maximum allowable temperature, and the maximum allowable duration is a limit length of time for which the temperature of the exhaust gas is allowed to exceed the steady allowable temperature continuously.

According to this embodiment, a fuel injection amount is corrected to decrease if an exhaust temperature becomes too high, and thereby an exhaust temperature is reduced. Thus, it is possible to prevent damage to the turbine of the supercharger due to an excessive increase in the exhaust temperature.

In some embodiments, the supercharger comprises a turbocharger comprising a turbine disposed in an exhaust duct of the engine and driven to rotate by exhaust energy of exhaust gas discharged from the engine, and a compressor disposed in an intake duct of the engine and driven to rotate coaxially with the turbine. A bypass channel bypassing the turbine is connected to the exhaust duct of the engine, a waste-gate valve is disposed in the bypass channel, and the boost pressure of the supercharger is controlled by adjusting a valve opening degree of the waste-gate valve.

According to the above embodiment, the boost pressure of the supercharger is controlled by adjusting the valve opening degree of the waste-gate valve, which is a boost-pressure control unit, and thereby it is possible to prevent occurrence of surging in advance while suppressing rapid fluctuation of a boost pressure.

In some embodiments, the supercharger comprises a variable turbocharger comprising a turbine driven to rotate by exhaust energy of exhaust gas discharged from the engine, a compressor driven to rotate coaxially with the turbine, and a variable control mechanism configured to control a flow of the exhaust gas flowing into the turbine. Further, the boost pressure of the supercharger is controlled by controlling the flow of the exhaust gas flowing into the turbine by adjusting the variable control mechanism.

According to the above embodiment, the variable control mechanism, which is a boost-pressure control unit, is adjusted to control a flow of exhaust gas flowing into the turbine to control a boost pressure of the supercharger, which makes it possible to prevent surging in advance while suppressing rapid fluctuation of the boost pressure.

In some embodiments, the supercharger comprises: a high-pressure stage turbocharger comprising a high-pressure stage turbine disposed in an exhaust duct of the engine and driven to rotate by exhaust energy of exhaust gas discharged from the engine, and a high-pressure stage compressor disposed in an intake duct of the engine and driven to rotate coaxially with the high-pressure stage turbine; and a low-pressure stage turbocharger comprising a low-pressure stage turbine disposed in the exhaust duct at a downstream side of the high-pressure stage turbine, and a low-pressure stage compressor disposed in the intake duct at an upstream side of the high-pressure stage compressor and driven to rotate coaxially with the low-pressure stage turbine. A high-pressure stage bypass channel bypassing the high-pressure stage turbine and a low-pressure stage bypass channel bypassing the low-pressure stage turbine are connected to the exhaust duct of the engine, a high-pressure stage waste-gate valve is disposed in the high-pressure stage bypass channel, and a low-pressure stage waste-gate valve is disposed in the low-pressure stage bypass channel. Further, boost pressures of the high-pressure stage turbocharger and the low-pressure stage turbocharger are controlled individually by adjusting respective valve opening degrees of the high-pressure stage waste-gate valve and the low-pressure stage waste-gate valve.

According to the present embodiment, in a two-stage supercharging system including the high-pressure stage turbocharger and the low-pressure stage turbocharger, the valve opening degree of the high-pressure stage waste-gate valve being the boost-pressure control unit for the high-pressure stage turbocharger and the valve opening degree of the low-pressure stage waste-gate valve being the boost-pressure control unit for the low-pressure stage turbocharger are adjusted, and thereby the boost pressures of the high-pressure stage turbocharger and the low-pressure stage turbocharger are controlled, which makes it possible to prevent occurrence of surging in advance while suppressing rapid fluctuation of the boost pressure.

In some embodiments, the supercharger comprises: a turbocharger comprising a turbine disposed in an exhaust duct of the engine and driven to rotate by exhaust energy of exhaust gas discharged from the engine, and a compressor disposed in an intake duct of the engine and driven to rotate coaxially with the turbine; and an electric turbocharger comprising an electric compressor disposed upstream or downstream of the compressor of the turbocharger, a motor configured to drive the electric compressor to rotate, and a rotation-speed control unit configured to control a rotation speed of the motor. A bypass channel bypassing the turbine is connected to the exhaust duct of the engine, and a waste-gate valve is disposed in the bypass channel. The boost pressure of the turbocharger is controlled by adjusting a valve opening degree of the waste-gate valve, and a boost pressure of the electric turbocharger is controlled by controlling the rotation speed of the motor with the rotation-speed control unit.

According to the present embodiment, in a two-stage supercharging system including the turbocharger and the electric turbocharger, the valve opening degree of the waste-gate valve being the boost-pressure control unit for the turbocharger is adjusted, and the rotation speed of the motor is controlled by the rotation-speed control unit being the boost-pressure control unit for the electric turbocharger, and thereby the boost pressure of each of the turbocharger and the electric turbocharger is controlled, which makes it possible to prevent occurrence of surging in advance while suppressing rapid fluctuation of the boost pressure.

In at least one embodiment of the present invention, a control device for a supercharging system for supplying compressed intake air to an engine, the supercharging system comprising a supercharger configured to compress intake air to be supplied to the engine, a boost-pressure control unit configured to control a boost pressure of the supercharger, and a control device configured to control the boost-pressure control unit, comprises: an engine controller comprising an engine signal input part to which various sensor signals related to an operational state of the engine are to be inputted, an engine control part configured to control an operational state of the engine and to compute a target boost pressure of the supercharger on the basis of the sensor signals inputted into the engine signal input part, and an engine signal output part configured to output the target boost pressure computed by the engine control part; and a turbo controller comprising a turbo signal input part to which at least sensor signals related to an operational state of the supercharger from among the various sensor signals related to an operational state of the engine and the target boost pressure are to be inputted, and a turbo-control part configured to compute a target boost-pressure corrected value by correcting the target boost pressure inputted to the turbo signal input part and compute a turbo control command value corresponding to the target boost-pressure corrected value, and a turbo signal output part configured to output the turbo control command value computed by the turbo control part to the boost-pressure control unit, the turbo controller comprising a control part and a signal input-output part provided separately and independently from the engine controller. The turbo control part is configured to compute a surge pressure which is a limit pressure at which surging occurs, on the basis of the sensor signals inputted to the turbo signal input part, compute an upper-limit pressure by subtracting a pressure value corresponding to a margin limit value defined in advance as a constant value from the computed surge pressure, and compare the upper-limit pressure with the target boost pressure and correct the target boost pressure so that the target boost-pressure corrected value coincides with the upper-limit pressure if the target boost pressure is larger than the upper-limit pressure.

According to this embodiment, a target boost-pressure corrected value is computed by the turbo controller, and a turbo control command value corresponding to the target boost-pressure corrected value is computed, and the turbo control command value is outputted to the boost-pressure control unit. Specifically, the turbo controller itself performs the entire control of the boost-pressure control unit, and does not need to communicate with the engine controller, which makes it possible to control the boost-pressure control unit quickly while avoiding an influence from communication delay of the engine controller.

Further, in the present embodiment, the upper limit pressure and the target boost pressure are compared, and if the target boost pressure is larger than the upper limit pressure, the target boost pressure is corrected so as to match the target boost pressure corrected value with the upper limit pressure, and thus the computation logics for correcting a target boost pressure are simple. Accordingly, it is possible to simplify the computation logics of the turbo controller, and to compute a turbo control command value in an instant, which makes it possible to improve control responsiveness of a boost-pressure control unit such as the W/G valve and the VG actuator.

Advantageous Effects

According to at least one embodiment of the present invention, it is possible to provide a control device for a supercharging system capable of preventing occurrence of surging in advance while suppressing rapid fluctuation of a boost pressure, and of controlling the boost pressure quickly while avoiding an influence from communication delay.

DETAILED DESCRIPTION

Embodiments of the present invention will now be described in more detail with reference to the accompanying drawings.

However, the scope of the present invention is not limited to the following embodiments. It is intended that dimensions, materials, shapes, relative positions and the like of components described in the embodiments shall be interpreted as illustrative only and not limitative of the scope of the present invention.

First Embodiment

Figure 1:
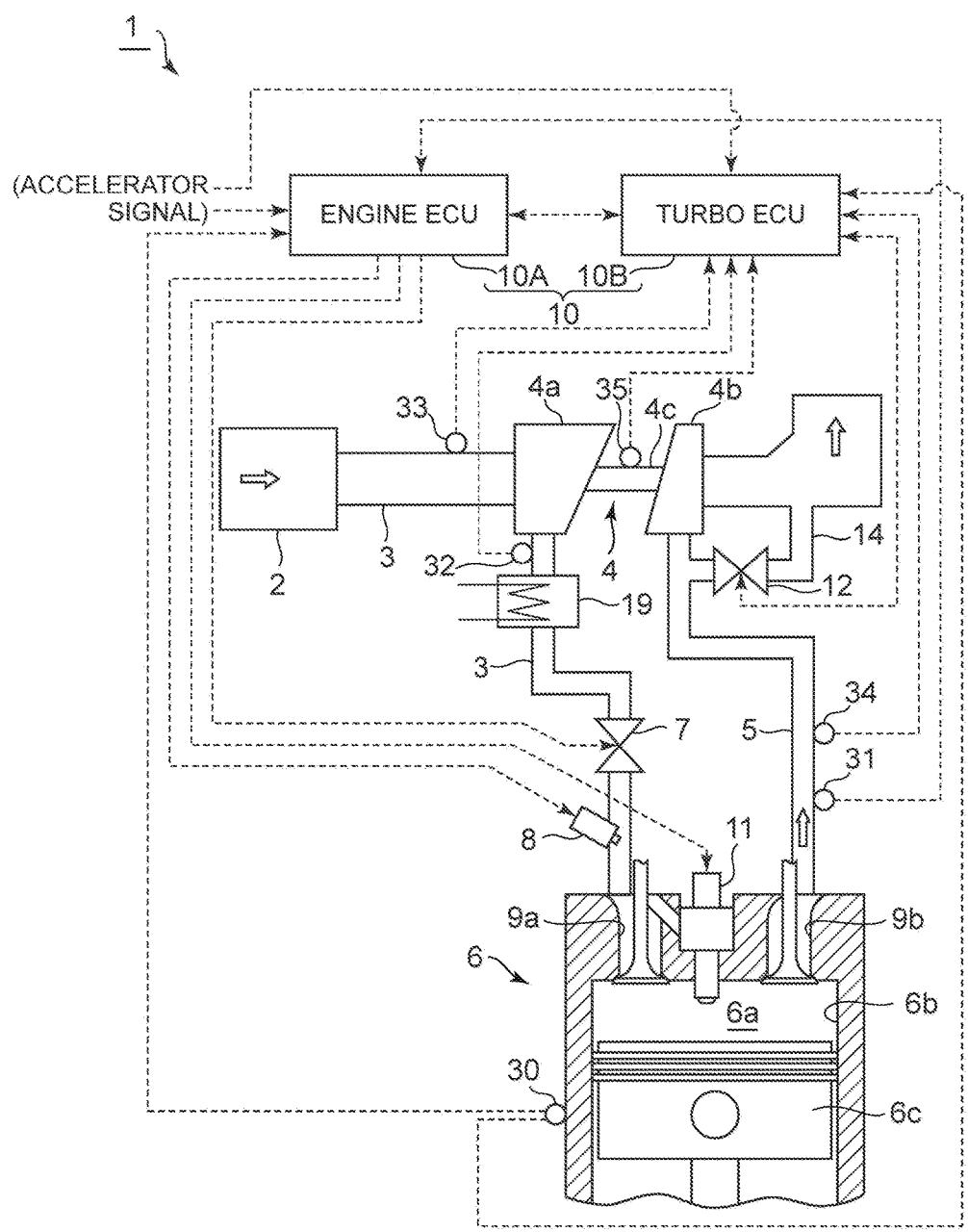
FIG. 1 is an overall configuration diagram of an engine system to which a control device of a supercharging system according to the first embodiment of the present invention is to be applied.

FIG. 1 is an overall configuration diagram of an engine system to which a control device of a supercharging system according to the first embodiment of the present invention is to be applied.

In the engine system 1 according to the present embodiment illustrated in FIG. 1, air (intake air) introduced into an intake duct 3 via an air cleaner 2 flows into a compressor 4a of a turbocharger 4 (supercharger). The turbocharger 4 includes a compressor 4a disposed in the intake duct 3, a turbine 4b disposed in an exhaust duct 5, and a rotor 4c coupling the compressor 4a and the turbine 4b. The turbine 4b is driven to rotate by exhaust energy of exhaust gas discharged from the engine 6, and thereby the compressor 4a is coaxially driven, so as to compress the intake air flowing into the compressor 4a.

The intake air compressed by the compressor 4a is cooled by an intercooler 19, and an intake amount of the intake air is adjusted by a throttle valve 7. The intake air is premixed with fuel injected from an injector 8, and supplied via an intake port 9a to a combustion chamber 6a of the engine 6 defined between a cylinder liner 6b and a top surface of a piston 6c. Premixed gas supplied to the combustion chamber 6a is ignited by a spark plug 11, and then combusted and expanded in the combustion chamber 6a. Exhaust gas generated in the combustion chamber 6a is discharged to the exhaust duct 5 via the exhaust port 9b.

The exhaust gas discharged to the exhaust duct 5 flows into the turbine 4b of the above described turbocharger 4 to drive the turbine 4b to rotate. Further, a bypass channel 14 bypassing the turbine 4b is connected to the exhaust duct 5. A waste-gate valve 12 is disposed in the bypass channel 14.

A flow rate of exhaust gas flowing through the turbine 4b and a flow rate of exhaust gas flowing through the bypass channel 14 can be controlled by adjusting the opening degree of the waste-gate valve 12. By controlling a flow rate of exhaust gas flowing through the turbine 4b, it is possible to control the rotation speed of the turbine 4b and the rotation speed of the compressor 4a driven coaxially with the turbine 4b. In other words, the waste-gate valve 14 in the present embodiment corresponds to a boost-pressure control unit which controls a boost pressure of intake air compressed by the compressor 4a.

The valve opening degree of the waste-gate valve 12 is controlled by a control device 10. The supercharging system of the present embodiment includes the above described turbocharger 4, the waste-gate valve 12, and the control device 10.

The control device 10 includes an engine ECU 10A (engine controller) and a turbo ECU 10B (turbo controller). The ECU 10A and the turbo ECU 10B each comprise a microcomputer separate from one another, the microcomputer including a central processing unit (CPU), a random access memory (RAM), a read only memory (ROM), and an I/O interface.

Figure 2:
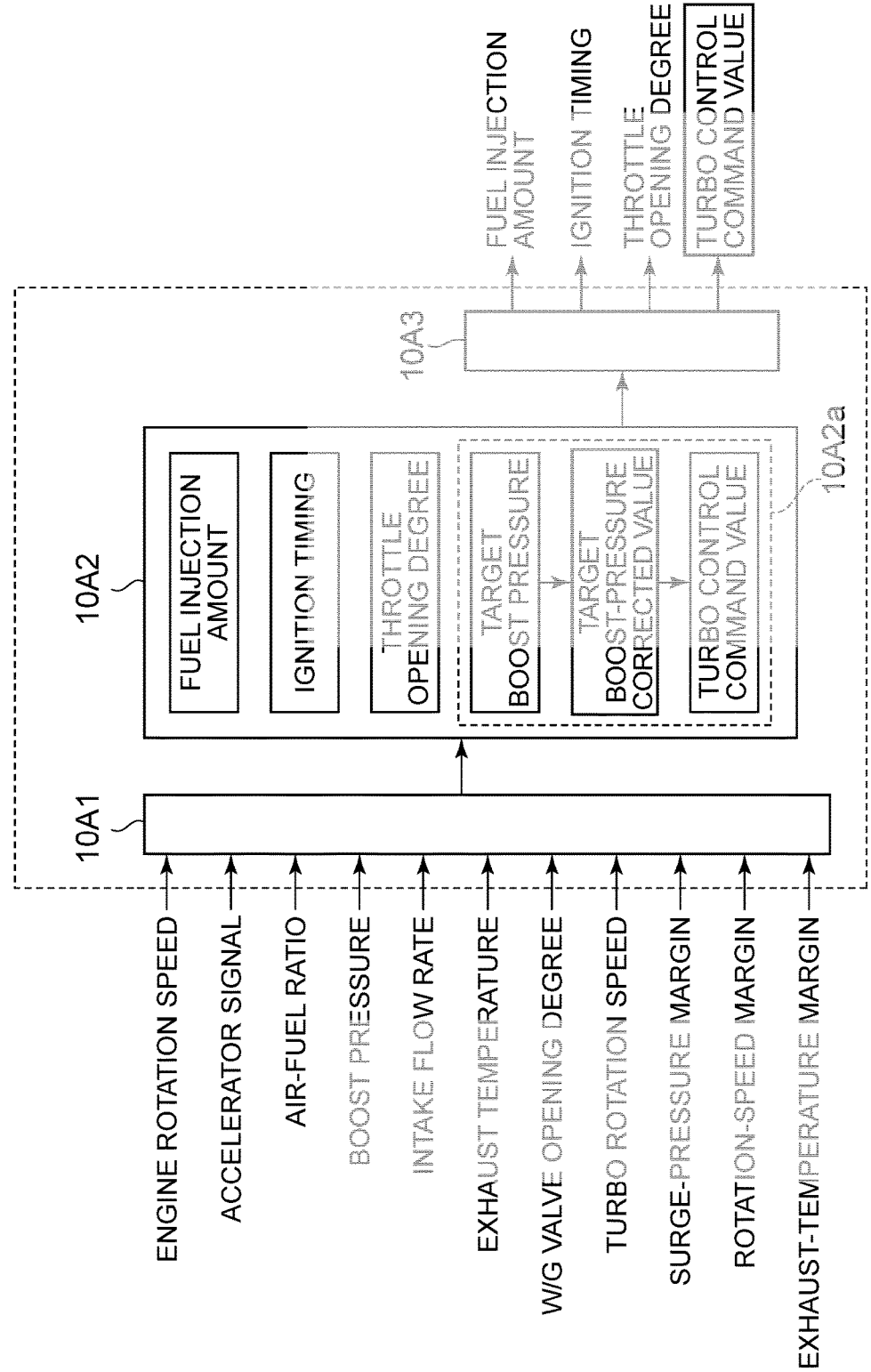
FIG. 2 is a block diagram for describing functions of an engine ECU.

FIG. 2 is a block diagram for describing functions of an engine ECU. As illustrated in FIG. 2, the engine ECU 10A includes an engine-signal input part 10A1 to which various sensor signals related to an operational state of the engine are inputted, an engine control part 10A2 for controlling the operational state of the engine, and an engine-signal output part 10A3 for outputting control command values or the like for various devices calculated by the engine control part 10A2.

Figure 3:
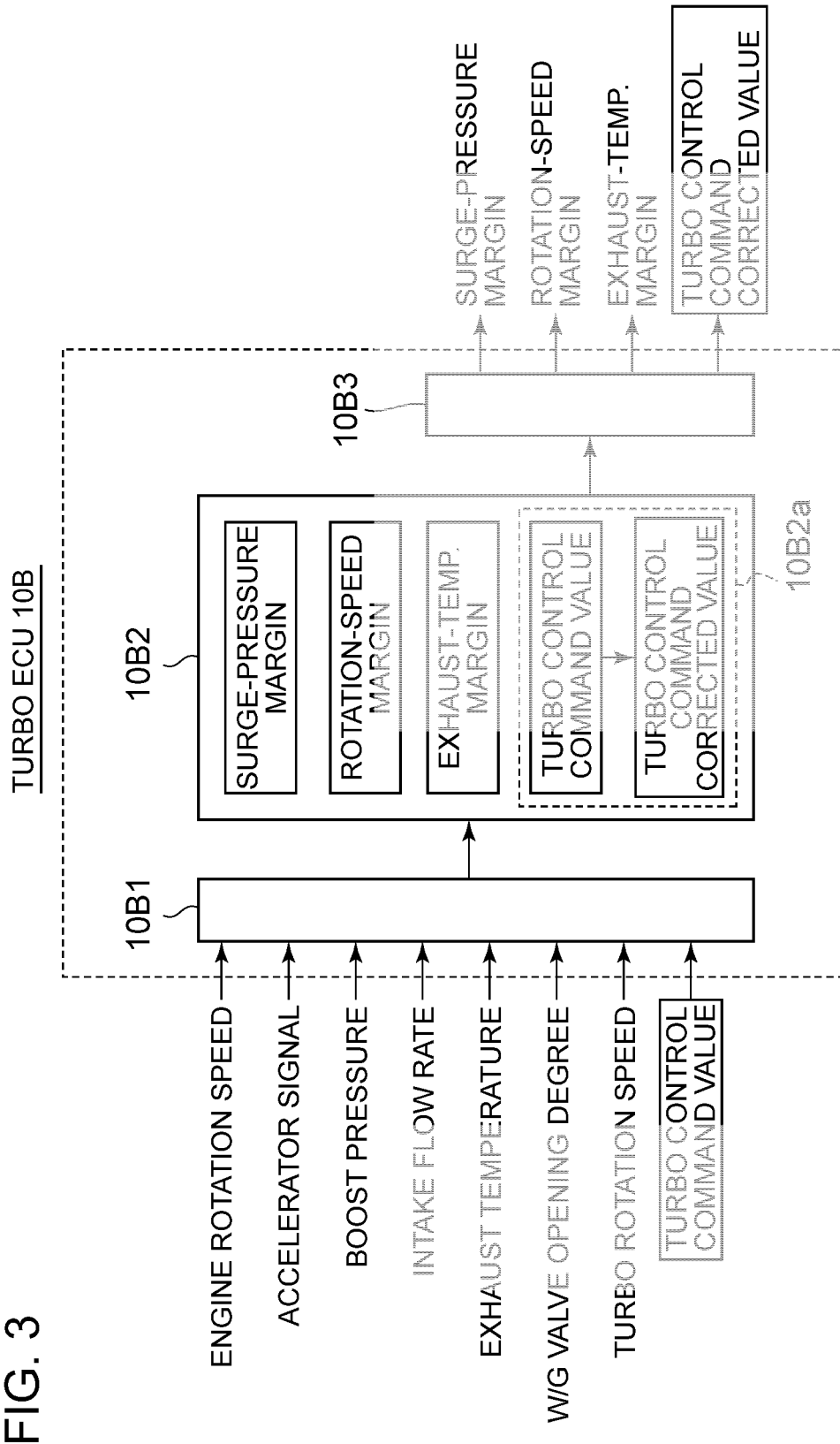
FIG. 3 is a block diagram for describing functions of a turbo ECU.

FIG. 3 is a block diagram for describing functions of a turbo ECU. As illustrated in FIG. 3, the turbo ECU 10B includes a turbo signal input part 10B1 to which at least sensor signals related to an operational state of the turbocharger 4 are inputted, from among various signals related to the operational state of the engine, a turbo control part 10B2 which computes a margin or the like described below of the turbocharger 4, and a turbo signal output part 10B3 which outputs the margin or the like computed by the turbo control part 10B2.

Various sensor signals related to an operational state of the engine are inputted to the engine-signal input part 10A1 of the engine ECU 10A, the sensor signals including: an engine rotation speed detected by a rotation-speed sensor 30; an acceleration signal detected by an accelerator-position sensor (not illustrated); an air-fuel ratio detected by an air-fuel ratio sensor 31; a boost pressure detected by a pressure sensor 32; an intake flow rate detected by an air-flow meter 33; an exhaust temperature detected by an exhaust-temperature sensor 34; a valve-opening degree of the waste-gate valve 12; a turbo rotation speed detected by a turbo rotation speed sensor 35; and a surge-pressure margin, a rotation-speed margin, and an exhaust margin computed by the turbo ECU 10B.

The engine control part 10A2 of the engine ECU 10A computes control command values for various devices, such as a fuel-injection amount, an ignition timing, and a throttle opening degree, on the basis of various sensor signals inputted into the engine-signal input part 10A1. The computed control command values are outputted from the engine-signal output part 10A3 to various devices. Further, the engine control part 10A2 computes a W/G valve opening-degree command value (turbo control command value), which is a control command value for the waste-gate valve 12 (boost-pressure control unit), to control a boost pressure of the turbocharger 4. The computed W/G valve opening-degree command value is outputted from the engine-signal output part 10A3 to the turbocharger 4 via the turbo ECU 10B.

To the turbo signal input part 10B1 of the turbo ECU 10B, for instance, an engine rotation speed, an accelerator signal, a boost pressure, an intake flow rate, an exhaust temperature, a valve opening degree of the waste-gate valve 12, and a turbo rotation speed are inputted from the various sensors, at least as sensor signals related to an operational state of the turbocharger 4. In addition, a W/G valve opening-degree command value outputted from the engine ECU 10A is inputted.

The turbo control part 10B2 of the turbo ECU 10B computes a surge-pressure margin, a rotation-speed margin, and an exhaust-temperature margin as follows, on the basis of various sensor signals inputted into the turbo signal input part 10B1. The computed surge-pressure margin, rotation-speed margin, and exhaust-temperature margin are outputted from the turbo signal output part 10B3 to the engine ECU 10A.

The above engine ECU 10A, the turbo ECU 10B, the various sensors, and the various devices, are connected to each other to be communicable via CAN.

Figure 4:
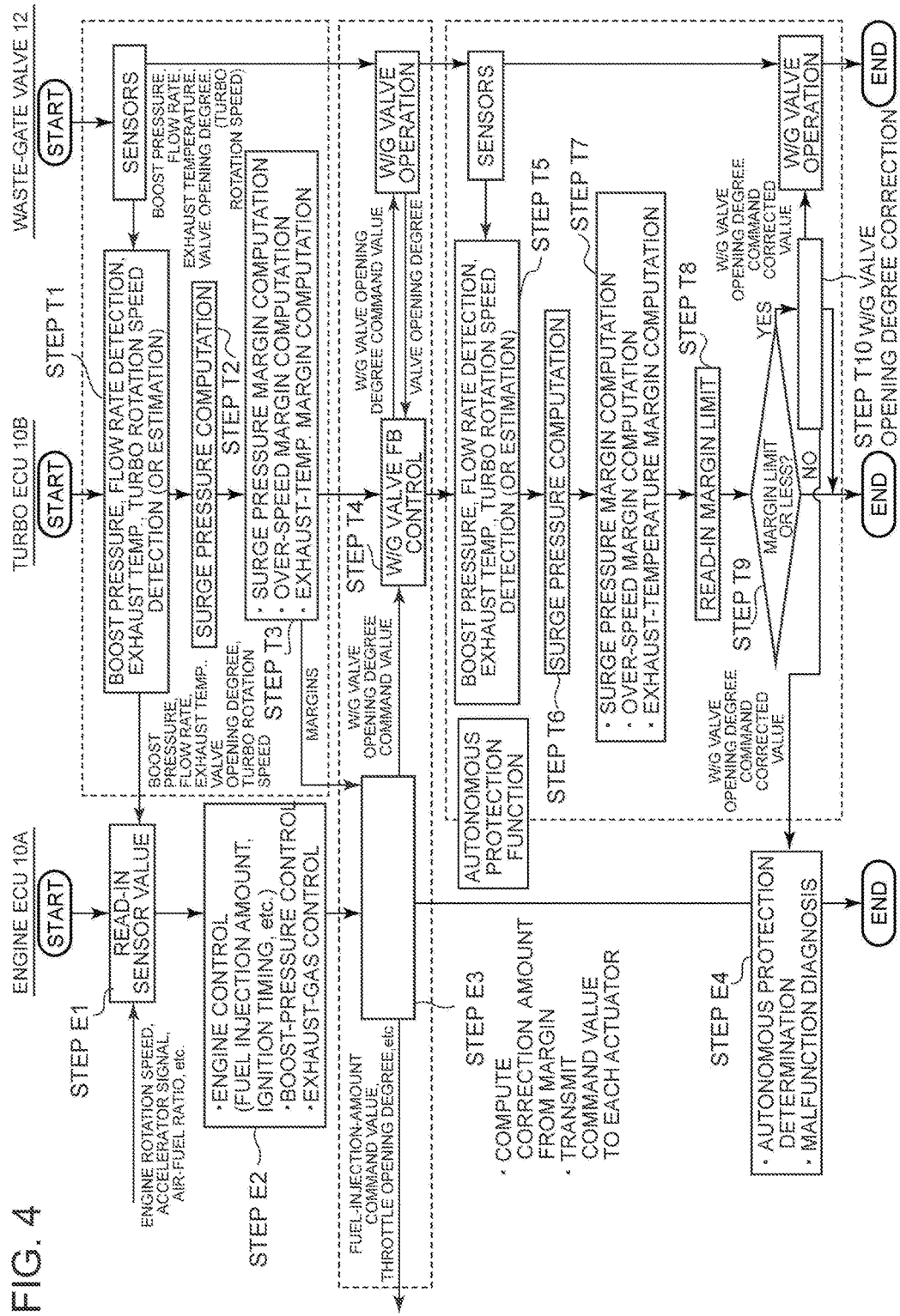
FIG. 4 is a control flowchart of a boost-pressure control unit according to the first embodiment.

FIG. 4 is a control flowchart of a boost-pressure control unit according to the first embodiment.

As illustrated in FIG. 4, the engine ECU 10A reads in the above described various sensor signals (step E1), and then computes control command values for the various devices, such as a fuel-injection amount, an ignition timing, a throttle opening, and a boost pressure (step E2). In parallel to this, the turbo ECU 10B reads in the above described various sensor signals (step T1), computes a surge pressure (step T2), and computes each of a surge pressure margin, a rotation-speed margin, and an exhaust-temperature margin (step T3). The computed surge-pressure margin, rotation-speed margin, and exhaust-temperature margin are each outputted to the engine ECU 10A. The engine ECU 10A computes a correction amount on the basis of each margin, and computes control command values on the basis of the correction amount, and output the control command values to the various devices (step E3). From among the control command values, a W/G valve opening-degree command value is outputted to the turbo ECU 10B. The turbo ECU 10B performs a feedback control so as to match the valve opening degree of the waste-gate valve 12 to the W/G valve opening-degree command value (step T4).

Figure 5:
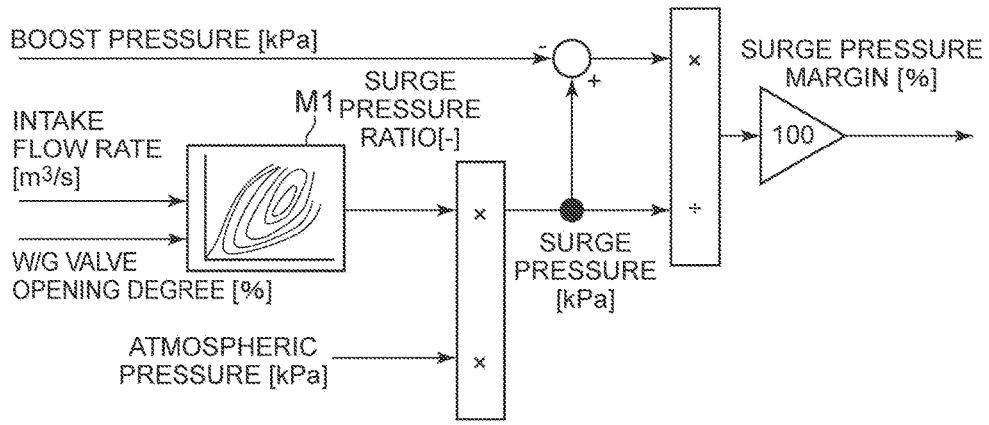
FIG. 5 is a diagram for describing computation logics for computing a surge-pressure margin.
Figure 6A:
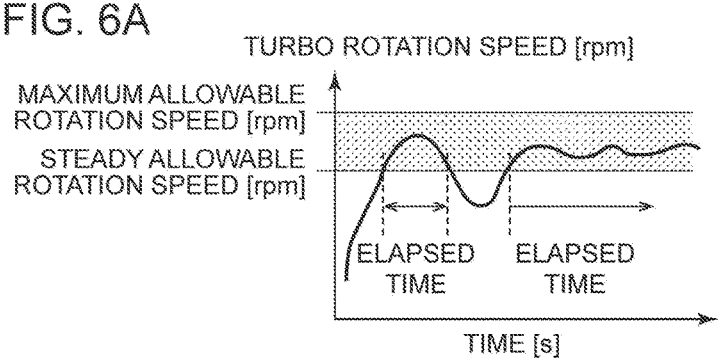
FIG. 6 is a diagram for describing computation logics for computing a rotation-speed margin.

A method to compute the above margins will now be described with reference to FIGS. 5 to 7. FIG. 5 is a diagram for describing computation logics for computing a surge-pressure margin, FIGS. 6A and 6B are diagrams for describing computation logics for computing a rotation-speed margin, and FIGS. 7A and 7B are diagrams for describing computation logics for computing an exhaust-temperature margin.

As illustrated in FIG. 5, to compute a surge-pressure margin, firstly, an intake flow rate and a W/G valve opening degree are inputted to a surge-pressure map M1 to calculate a surge pressure ratio, and the surge pressure ratio is multiplied by an atmospheric pressure to obtain a surge pressure. It should be noted that a turbo rotation speed or another parameter related to a turbo rotation speed may be inputted instead of a W/G valve opening degree. The surge pressure refers to a limit pressure at which surging occurs. From the calculated surge pressure and a boost pressure detected by the pressure sensor 32, a surge-pressure margin represented by the following expression (1) is computed.

$$\text{Surge-pressure margin (\%)} = (\text{Surge pressure} - \text{boost pressure}) / \text{surge pressure} \times 100 \quad (1)$$

Figure 6B:
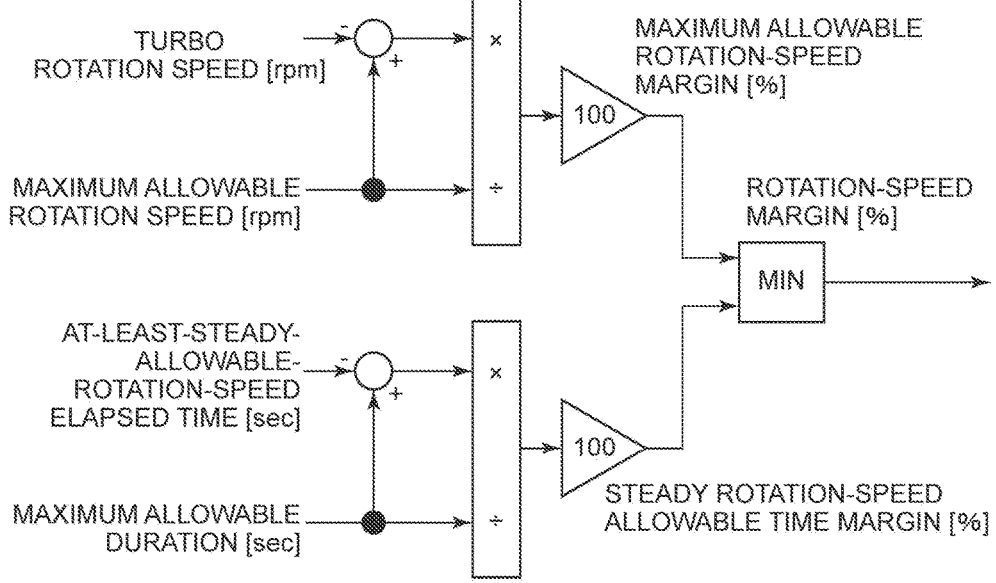
Figure 7A:
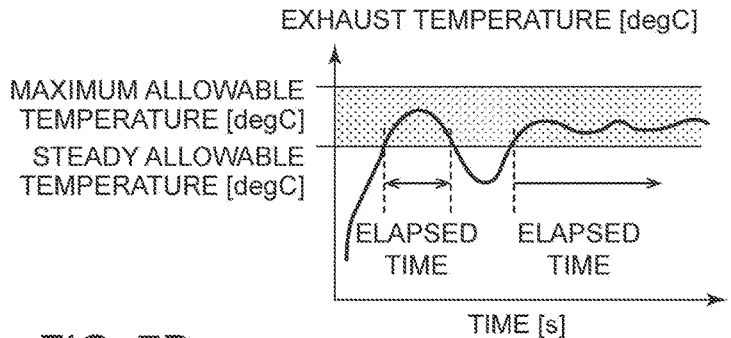
FIG. 7 is a diagram for describing computation logics for computing an exhaust-temperature margin.
Figure 7B:
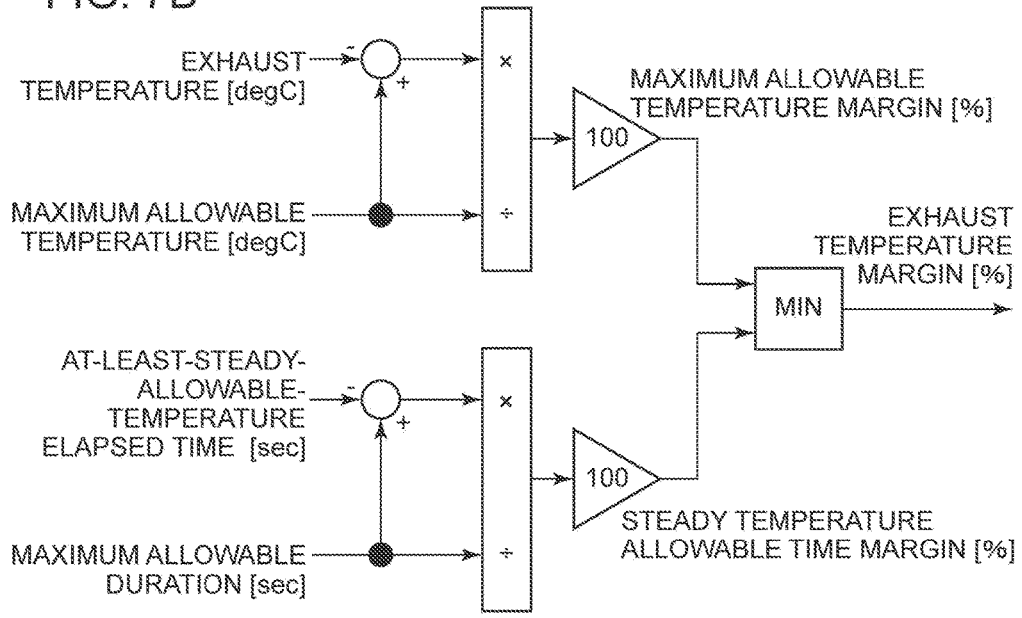

As illustrated in FIG. 6B, a rotation-speed margin is computed as smaller one of a maximum allowable rotation-speed margin or a steady rotation-speed allowable time margin. The maximum allowable rotation-speed margin refers to a margin with respect to the maximum allowable rotation speed that the turbocharger 4 can tolerate, as represented by the following expression (2).

$$\text{Maximum allowable rotation-speed margin (\%)} = (\text{Maximum allowable rotation speed} - \text{turbo rotation speed}) / \text{Maximum allowable rotation speed} \times 100 \quad (2)$$

Further, the steady rotation-speed allowable time margin is expressed by the following expression (3).

$$\text{Steady rotation-speed allowable time margin (\%)} = (\text{Maximum allowable duration} - \text{at-least-steady-allowable-rotation-speed elapsed time}) / \text{maximum allowable duration} \times 100 \quad (3)$$

In this expression, at-least-steady-allowable-rotation-speed elapsed time is an elapsed time shown in FIG. 6A during which the turbo rotation speed of the turbocharger 4 does not exceed the maximum allowable rotation speed but continuously exceeds a steady allowable rotation speed, and the maximum allowable duration is a limit length of time for which continuous excess over the steady allowable rotation speed is permitted.

Further, as illustrated in FIG. 7B, an exhaust-temperature margin is computed as the smaller one of a maximum allowable temperature margin and a steady temperature allowable time margin. The maximum allowable temperature margin refers to a margin with respect to the maximum allowable temperature that the turbine 4b of the turbocharger 4 can tolerate, as represented by the following expression (4).

$$\text{Maximum allowable temperature margin (\%)} = (\text{Maximum allowable temperature} - \text{exhaust temperature}) / \text{Maximum allowable temperature} \times 100 \quad (4)$$

Further, the steady temperature allowable time margin is expressed by the following expression (5).

$$\text{Steady temperature allowable time margin (\%)} = (\text{Maximum allowable continuance time} - \text{at-least-steady-allowable-temperature elapsed time}) / \text{maximum allowable duration} \times 100. \quad (5)$$

In this expression, at-least-steady-allowable-temperature elapsed time is an elapsed time shown in FIG. 7A during which the turbine 4b of the turbocharger 4 does not exceed the maximum allowable temperature but continuously exceeds a steady allowable temperature, and the maximum allowable duration is a limit length of time for which continuous excess over the steady allowable temperature is permitted.

The accordingly-computed surge-pressure margin, rotation-speed margin, and exhaust-temperature margin are each outputted to the engine ECU 10A as illustrated in FIG. 4 (step T3). The engine ECU 10A computes a correction amount on the basis of each margin, computes control command values on the basis of the correction amount, and outputs the control command values to the various devices (step E3). Specifically, margins such as a surge-pressure margin and a rotation-speed margin are used mainly in computation of a W/G valve opening-degree command value. An exhaust-temperature margin is used mainly in computation of a control command value of a fuel injection amount.

Figure 8:
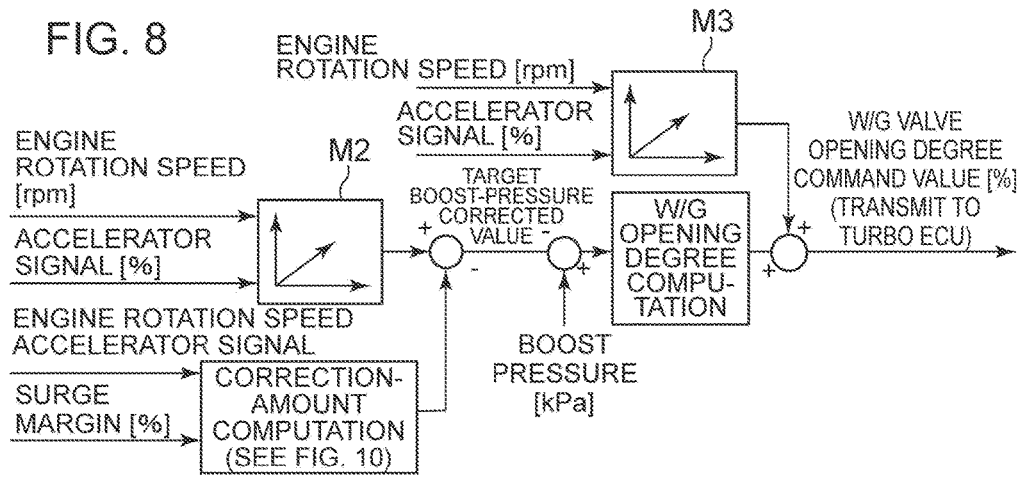
FIG. 8 is a diagram for describing computation logics for computing a W/G valve opening-degree command value.
Figure 9:
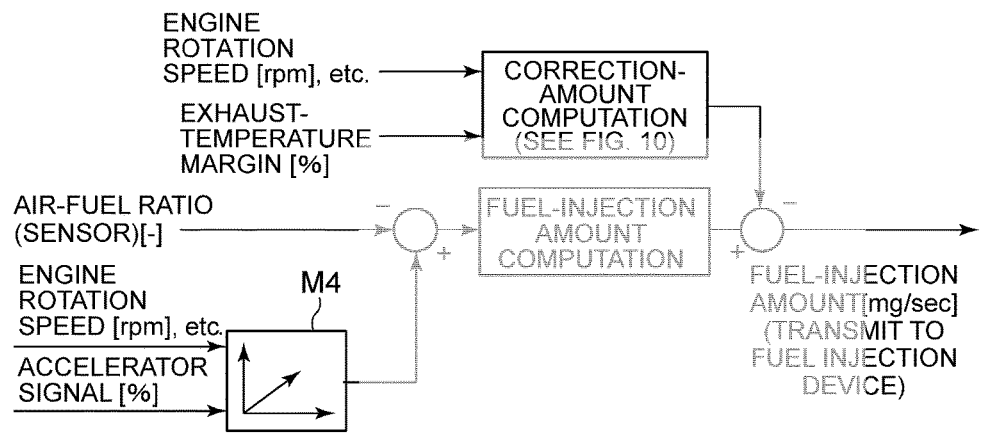
FIG. 9 is a diagram for describing computation logics for computing a control command value related to a fuel injection amount.

FIG. 8 is a diagram for describing computation logics for computing a W/G valve opening-degree command value. FIG. 9 is a diagram for describing computation logics for computing a control command value related to a fuel injection amount.

As illustrated in FIG. 8, to compute a W/G valve opening-degree command value, an engine rotation speed and an accelerator signal are inputted into a target boost-pressure map M2 to obtain a target boost pressure. Then, a correction amount computed on the basis of a margin or the like by the following method is subtracted from the obtained target boost pressure to calculate a target boost-pressure corrected value. A feedback control for a boost pressure detected by the pressure sensor 32 is performed to compute a W/G valve opening degree for a difference between a target boost-pressure corrected value and a boost pressure. To the W/G valve opening degree, a value calculated by inputting an engine rotation speed and an accelerator signal to a W/G valve opening-degree map M3 is added, and thereby a W/G valve opening-degree command value is calculated. This computation is performed by a turbo control command value computation part 10A2a of the engine control part 10A2 depicted in FIG. 2. While the above logic additionally includes a W/G valve opening-degree map M3 as a feed forward circuit to improve responsiveness, the W/G valve opening-degree map M3 may be removed from the above logic to provide a simpler feedback control circuit.

Further, as illustrated in FIG. 9, to compute a control command value of a fuel injection amount, firstly, an engine rotation speed, an accelerator signal, and the like are inputted into an air-fuel ratio target value map M4, to calculate a target air-fuel ratio. A feedback control for an air-fuel ratio detected by the air-fuel ratio sensor 31 is performed to compute a fuel injection amount. A correction amount computed on the basis of an exhaust-temperature margin or the like by the following method is subtracted from the calculated fuel injection amount to calculate a control command value for a fuel injection amount. This computation is performed by an engine control part 10A2 depicted in FIG. 2.

Figure 10:
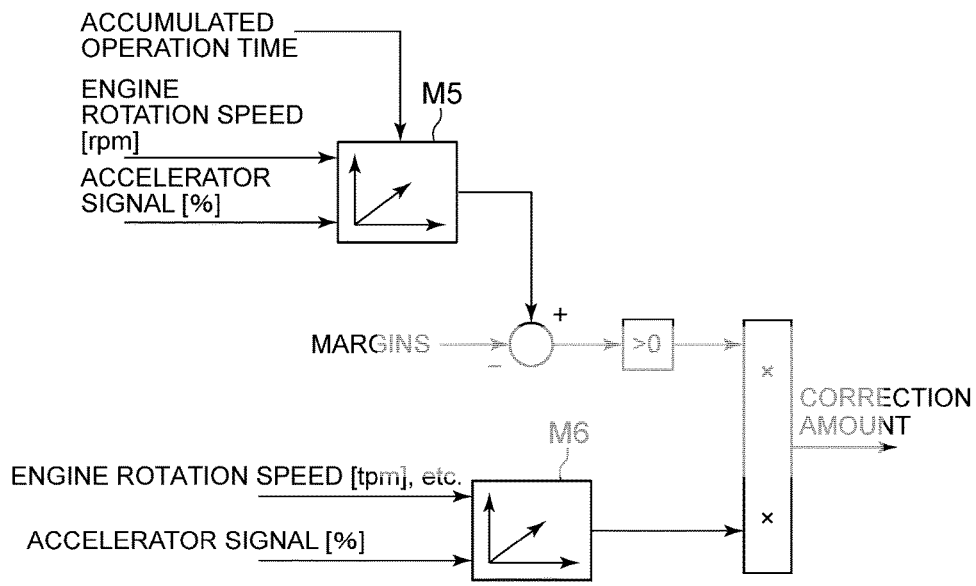
FIG. 10 is a diagram for describing computation logics for computing a correction amount to be used in computation of a control command value.

FIG. 10 is a diagram for describing computation logics for computing a correction amount to be used in computation of a control command value. As shown in FIG. 10, a correction amount is calculated by, if each of a surge-pressure margin, a rotation-speed margin, and an exhaust-temperature margin is below a margin limit, multiplying a difference between the margin limit and each margin by a gain. As it can be seen in FIG. 10, a correction amount changes in accordance with the magnitude of a margin, and is calculated to be greater with a decrease in the margin.

Whereas a margin limit may be set as a constant value in advance, a margin limit may be calculated by inputting an engine rotation speed and an accelerator signal to a margin limit map M5 as shown in FIG. 10. In this way, it is possible to calculate a suitable margin limit taking account of an operational state of the engine. Further, an accumulated operational time may be inputted to the margin limit map M5 so as to calculate a greater margin limit with an increase in the accumulated operational time. In this way, it is possible to further enhance safety against surging for an engine with a longer accumulated operational time.

Whereas a gain may also be set as a constant value in advance, a gain may be calculated by inputting an engine rotation speed, an accelerator signal, and the like to a gain map M6 as shown in FIG. 10, which makes it possible to calculate a suitable gain taking account of an operational state of the engine.

The control device 10 of the supercharging system of the present embodiment has the above configuration, and computes a target boost-pressure corrected value by using a margin (surge margin), which is a numeral index representing a margin with respect to surging, and correcting a target boost pressure in accordance with the magnitude of the margin. The waste-gate valve 12 (boost-pressure control unit) is controlled so that the boost pressure of the turbocharger 4 (supercharger) reaches a target boost-pressure corrected value. With the above control device 10 of the supercharging system, the valve opening degree of the waste-gate valve 12 changes in accordance with the magnitude of the margin. Thus, it is possible to prevent surging in advance while reducing rapid fluctuation of a boost pressure, as compared to a typical case in which the boost-pressure control unit is switched alternatively on the basis of whether an operational point is in the surge region.

Further, the control device 10 of the supercharging system includes the turbo ECU 10B including a control part and a signal input part provided separately and independently from the engine ECU 10A. The turbo ECU 10B is different from the engine ECU 10A in that the turbo ECU 10B only performs control of the turbocharger 4. Thus, the turbo control part 10B2 of the turbo ECU 10B computes a margin, which makes it possible to compute a margin quickly and accurately. Thus, it is possible to control a boost pressure quickly while avoiding an influence from communication delay which may take place if a margin is computed by the engine ECU 10A.

Further, in the above embodiment, as depicted in FIG. 8, a surge-pressure margin is used as a margin for computing a correction amount to correct a target boost pressure, which makes it possible to control the waste-gate valve 12 accurately while preventing surging securely.

Further, in the above embodiment, a margin may include a rotation-speed margin in addition to a surge-pressure margin. For instance, the smaller one of a surge-pressure margin or a rotation-speed margin may be used as a margin. In this way, it is possible to prevent over-speed of the turbocharger 4 along with surging. Further, with the rotation-speed margin being defined as the smaller one of the maximum allowable rotation-speed margin or the steady rotation-speed allowable time margin, the turbocharger 4 does not exceed the maximum allowable rotation speed, but is permitted to exceed the steady allowable rotation speed (rated rotation speed of the turbocharger 4) temporarily. In this way, it is possible to perform such a control that maximizes performance of the turbocharger 4.

Further, in the above embodiment, as depicted in FIG. 9, a fuel injection amount is corrected by a correction amount computed on the basis of an exhaust-temperature margin. According to this embodiment, correction is performed to reduce a fuel injection amount if an exhaust temperature becomes too high, and thereby an exhaust temperature is reduced. Thus, it is possible to prevent damage to the turbine 4b of the turbocharger 4 due to an excessive increase in an exhaust temperature.

In some embodiments, as illustrated in FIG. 4, the turbo ECU 10B has an autonomous-protection function to re-compute a margin (surge-pressure margin, rotation-speed margin) of the turbocharger 4 on the basis of sensor signals related to an operational state of the turbocharger 4 after the waste-gate valve 12 is controlled on the basis of a W/G valve opening-degree command value (turbo control command value), and to correct the W/G valve opening-degree command value in accordance with the magnitude of the re-computed margin and output the corrected W/G valve opening-degree command value to the waste-gate valve 12 (boost-pressure control unit).

That is, after the waste-gate valve 12 is controlled in step T4 of the control flow shown in FIG. 4 and an operational state of the turbocharger 4 changes, the above described various sensor signals are read in again (step T5), a surge pressure is computed as shown in FIG. 5 (step T6), and a surge-pressure margin, a rotation-speed margin, and an exhaust-temperature margin are each re-computed as shown in FIGS. 5 to 8 (step T7). Then, as illustrated in FIG. 10, a margin limit is read in from the margin limit map M5 (step T8), the re-computed margin and the margin limit are compared (step T9), and a W/G valve opening-degree command value is corrected if the re-computed margin is not greater than the margin limit, and the corrected W/G valve opening-degree command corrected value is outputted to the waste-gate valve 12 (step T10). The steps T8 to T10 are performed by a turbo control command value correction computation part 10B2a of the turbo control part 10B2.

In the present embodiment, basically, the engine ECU 10A computes a W/G valve opening-degree command value corresponding to the above described target boost-pressure corrected value, and the W/G valve opening-degree command value is outputted to the waste-gate valve 12 to control the waste-gate valve 12. However, if the engine ECU 10A having complicated control logics and hardware configuration is to control the waste-gate valve 12 as described above, communication delay of the engine ECU 10A may be a problem, as described above. Thus, with the turbo ECU 10B having the above autonomous-protection function, it is possible to control the waste-gate valve 12 with the turbo ECU 10B quickly to avoid surging more securely, if the engine ECU 10A cannot control in time or if correction is so insufficient that surging cannot be avoided, for instance.

In the above embodiment, as illustrated in FIG. 4, the above turbo ECU 10B outputs the corrected W/G valve opening-degree command value (turbo control command value) also to the engine ECU 10A, when outputting the corrected W/G valve opening-degree command value to the waste-gate valve 12.

According to this embodiment, if the turbo ECU 10B controls the waste-gate valve 12 autonomously by the autonomous-protection function, the content of the control is transmitted also to the engine ECU 10A. Thus, the engine ECU 10A can control the waste-gate valve 12 from then on, or control other devices, taking account of the transmitted content of the control. Further, the turbo ECU 10B may autonomously store control of the waste-gate valve 12, which makes it possible to utilize the stored data for diagnosis of malfunction during maintenance (step E4).

Second Embodiment

Figure 11:
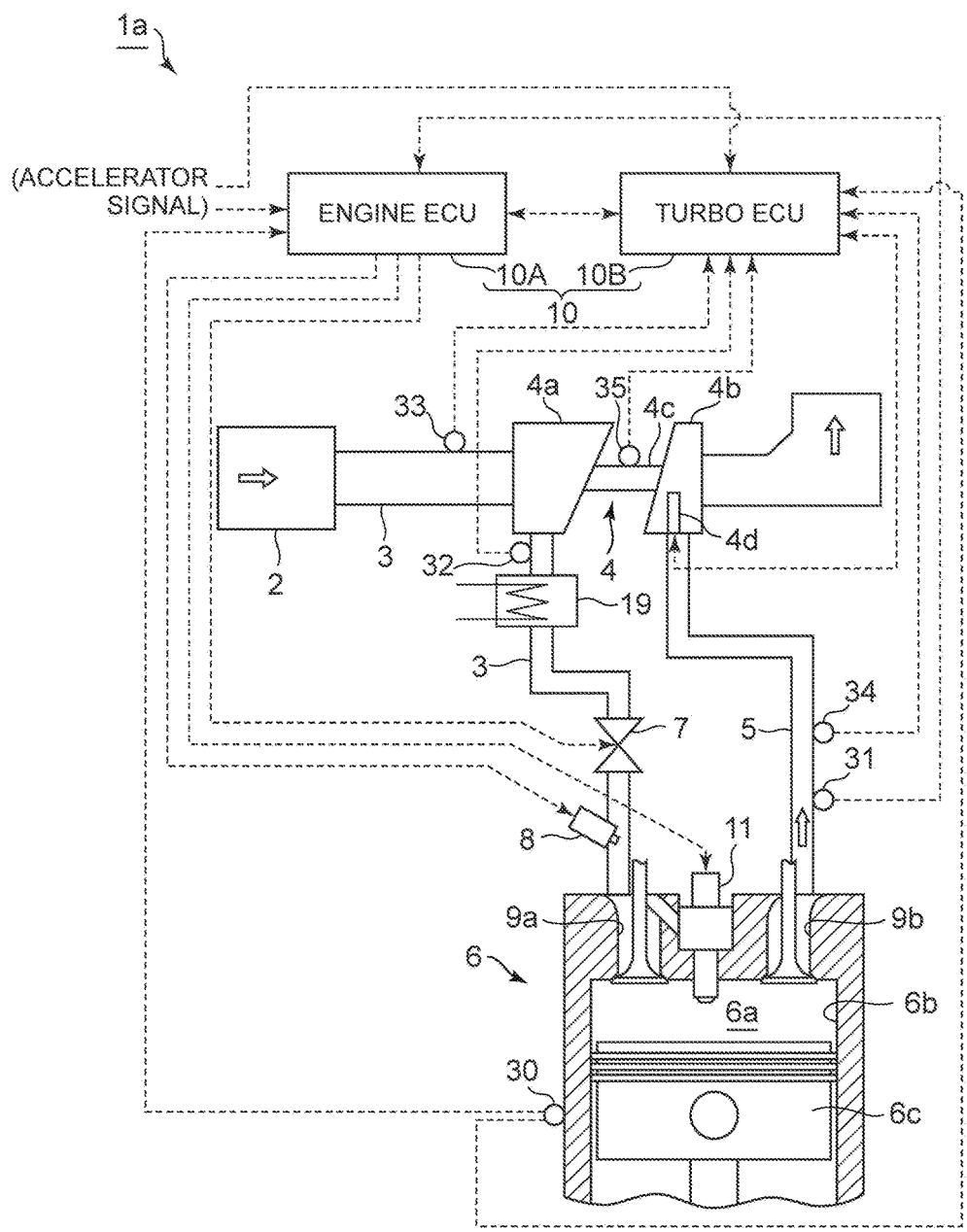
FIG. 11 is an overall configuration diagram of an engine system to which a control device of a supercharging system according to the second embodiment of the present invention is to be applied.

FIG. 11 is an overall configuration diagram of an engine system to which a control device of a supercharging system according to the second embodiment of the present invention is to be applied. The engine system 1a of the present embodiment is basically similar to the embodiment illustrated in FIG. 1 in terms of configuration, except that the engine system 1a does not include the bypass channel 14 and the waste-gate valve 12. Thus, the same component is associated with the same reference numeral and not described in detail.

In the present embodiment, as illustrated in FIG. 11, the turbocharger 4 is a variable turbocharger including the turbine 4b driven to rotate by exhaust energy of exhaust gas discharged from the engine 6, the compressor 4a driven coaxially with the turbine 4b, and a variable control mechanism 4d for controlling a flow of exhaust gas that flows into the turbine 4b. The variable control mechanism 4d is adjusted to control a flow of exhaust gas flowing into the turbine 4b, and thereby the boost pressure of the turbocharger 4 is controlled.

In other words, in the present embodiment, the variable control mechanism 4d corresponds to a boost-pressure control unit which controls a boost pressure of intake air compressed by the compressor 4a. The above turbocharger 4, for instance, includes a variable-displacement type turbocharger equipped with a variable nozzle mechanism 4d including a plurality of nozzle vanes disposed rotatably on the outer periphery of the turbine 4b.

According to the above embodiment, the variable control mechanism 4d, which is a boost-pressure control unit, is adjusted to control a flow of exhaust gas flowing into the turbine 4b to control a boost pressure of the turbocharger 4, which makes it possible to prevent surging in advance while suppressing rapid fluctuation of a boost pressure.

Third Embodiment

Figure 12:
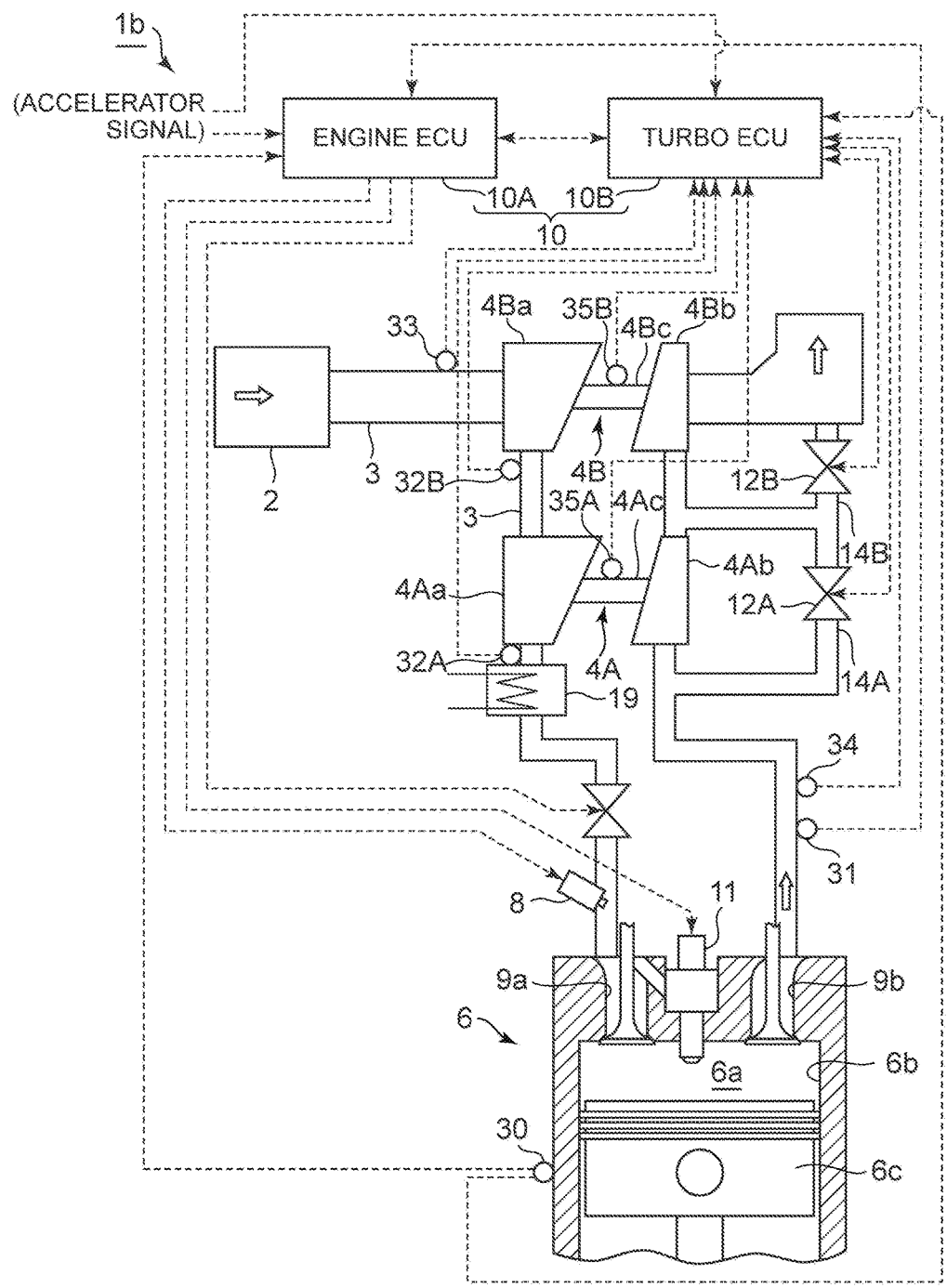
FIG. 12 is an overall configuration diagram of an engine system to which a control device of a supercharging system according to the third embodiment of the present invention is to be applied.

FIG. 12 is an overall configuration diagram of an engine system to which a control system of a supercharging system according to the third embodiment of the present invention is to be applied. The engine system 1b of the present embodiment is basically similar to the embodiment illustrated in FIG. 1 in terms of configuration, except for the two-stage turbo-charging system including two turbochargers, a high-pressure stage turbocharger 4A and a low-pressure stage turbocharger 4B. Thus, the same component is associated with the same reference numeral and not described in detail.

In the present embodiment, as illustrated in FIG. 12, the supercharger for compressing intake air to be supplied to the engine 6 includes the high-pressure stage turbocharger 4A and the low-pressure stage turbocharger 4B. The high-pressure stage turbocharger 4A includes a high-pressure stage turbine 4Ab disposed in the exhaust duct 5 of the engine 6 and driven to rotate by exhaust energy from the engine 6 and a high-pressure stage compressor 4Aa disposed in the intake duct 3 of the engine 6 and driven coaxially with the high-pressure stage turbine 4Ab. The low-pressure stage turbocharger 4B includes a low-pressure stage turbine 4Bb disposed in the exhaust duct 5 and on the downstream side of the high-pressure stage turbine 4Ab and a low-pressure stage compressor 4Ba disposed in the intake duct 3 and on the upstream side of the high-pressure stage compressor 4Aa and driven coaxially with the low-pressure stage turbine 4Bb. A high-pressure stage bypass channel 14A that bypasses the high-pressure stage turbine 4Ab and a low-pressure stage bypass channel 14B that bypasses the low-pressure stage turbine 4Bb are connected to the exhaust duct 5 of the engine 6. A high-pressure stage waste-gate valve 12A is disposed in the high-pressure stage bypass channel 14A, and a low-pressure stage waste-gate valve 12B is disposed in the low-pressure stage bypass channel 14B. The above described control device 10 adjusts the valve opening degrees of the high-pressure stage waste-gate valve 12A and the low-pressure stage waste-gate valve 12B individually, thereby controlling the boost pressures of the high-pressure stage turbocharger 4A and the low-pressure stage turbocharger 4B individually. That is, in the present embodiment, each of the high-pressure stage waste-gate valve 12A and the low-pressure stage waste-gate valve 12B corresponds to a boost-pressure control unit of the present invention.

Figure 13:
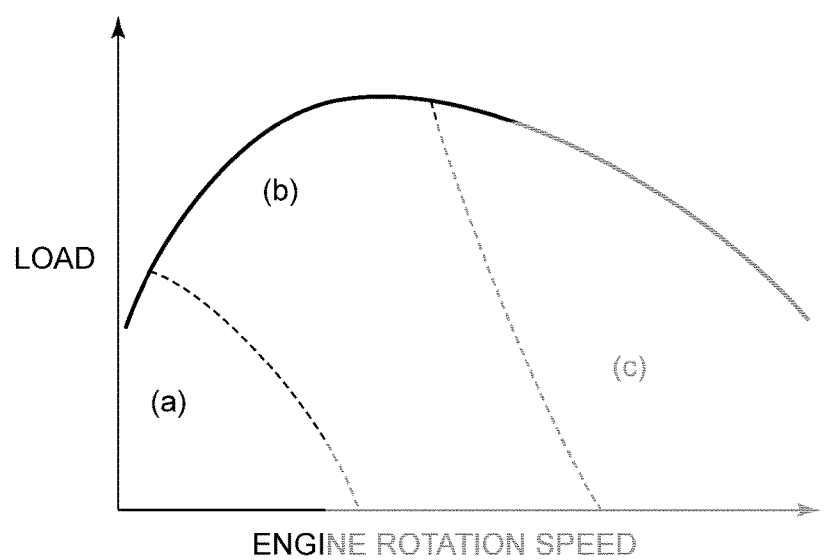
FIG. 13 is a two-dimensional map related to a control flag, where x-axis is an engine rotation speed and y-axis is a load.
Figure 14:
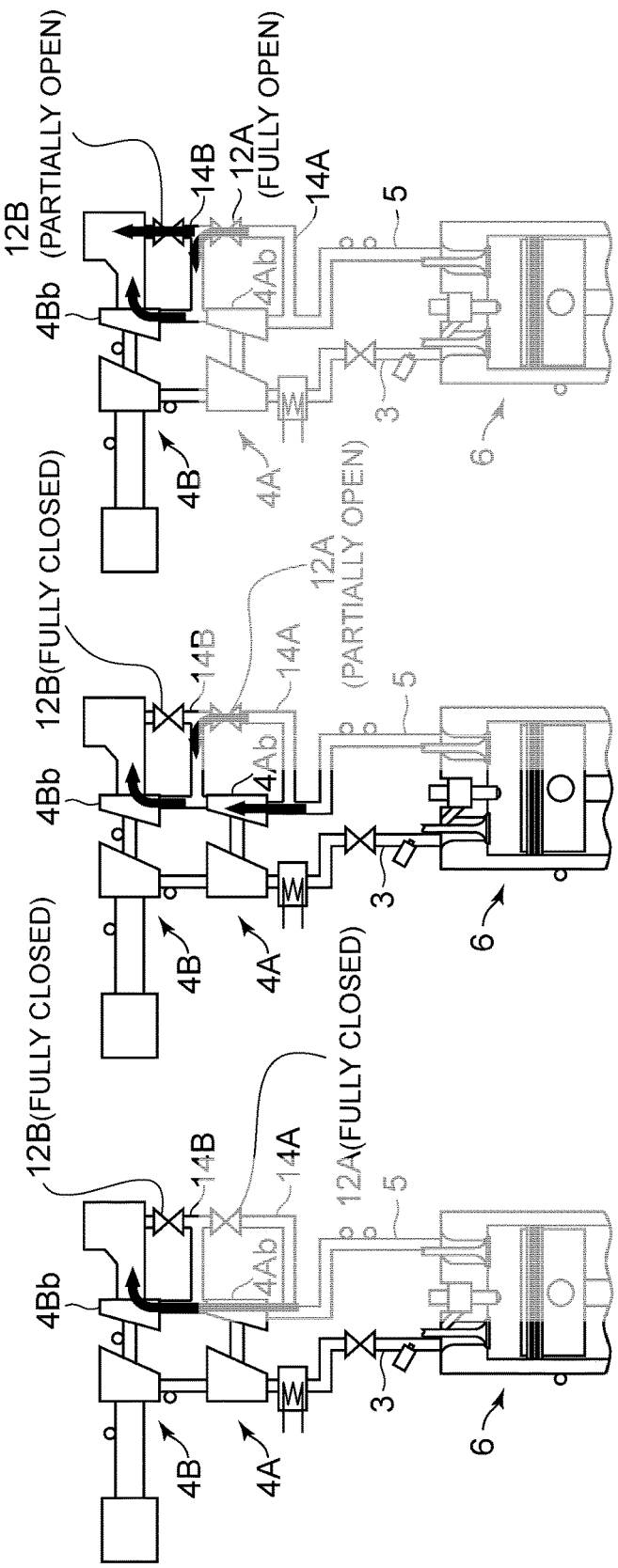
FIG. 14 is a diagram corresponding to FIG. 13, for describing operation of two waste-gate valves and a flow of exhaust gas.

Next, a method to control boost pressures of the high-pressure stage turbocharger 4A and the low-pressure stage turbocharger 4B will be described on the basis of FIGS. 13 to 15. FIG. 13 is a two-dimensional map related to a control flag, where x-axis is an engine rotation speed and y-axis is a load. FIG. 14 is a diagram corresponding to FIG. 13, for describing operation of two waste-gate valves and a flow of exhaust gas. The arrow in FIG. 14 indicates a flow direction of exhaust gas.

As shown in FIG. 13, the two waste-gate valves 12A, 12B are both controlled to be fully closed in a low-speed region (a). In this way, exhaust gas does not flow through the high-pressure stage bypass channel 14A and the low-pressure stage bypass channel 14B but flows into the high-pressure stage turbine 4Ab and the low-pressure stage turbine 4Bb through the exhaust duct 5, as illustrated in FIG. 14A. The high-pressure stage turbine 4Ab and the low-pressure stage turbine 4Bb are driven to rotate, and the high-pressure stage compressor 4Aa and the low-pressure stage compressor 4Ba are driven coaxially in association. As a result, intake air to be supplied to the engine 6 is supercharged.

If an engine rotation speed increases to enter a mid-speed region (b), the boost pressure of the high-pressure stage compressor 4A becomes particularly high, which raises a risk of surging. Thus, in the mid-speed region (b), as illustrated in FIG. 14B, the valve opening degree of the high-pressure stage waste-gate valve 12A is adjusted to reduce a flow rate of exhaust gas flowing through the high-pressure stage turbine 4Ab, and the boost pressure of the high-pressure stage compressor 4Aa is controlled. Meanwhile, the boost pressure of the low-pressure stage compressor 4Ba is lower than the boost pressure of the high-pressure stage compressor 4A and surging may not occur. Thus, the low-pressure stage waste-gate valve 12B is controlled to be kept in a fully-closed state.

If the engine rotation speed increases further to enter a high-speed region (c), the high-pressure stage waste-gate valve 12A is controlled to be fully open, so that exhaust gas does not flow into the high-pressure stage turbine 4Ab. Further, in the high-speed region, the boost pressure of the low-pressure stage compressor 4B also increases, which raises a risk of surging. Thus, in the high-speed region (c), the valve opening degree of the low-pressure stage waste-gate valve 12B is adjusted to reduce a flow rate of exhaust gas flowing through the low-pressure stage turbine 4Bb, and the boost pressure of the low-pressure stage compressor 4Ba is controlled.

Figure 15:
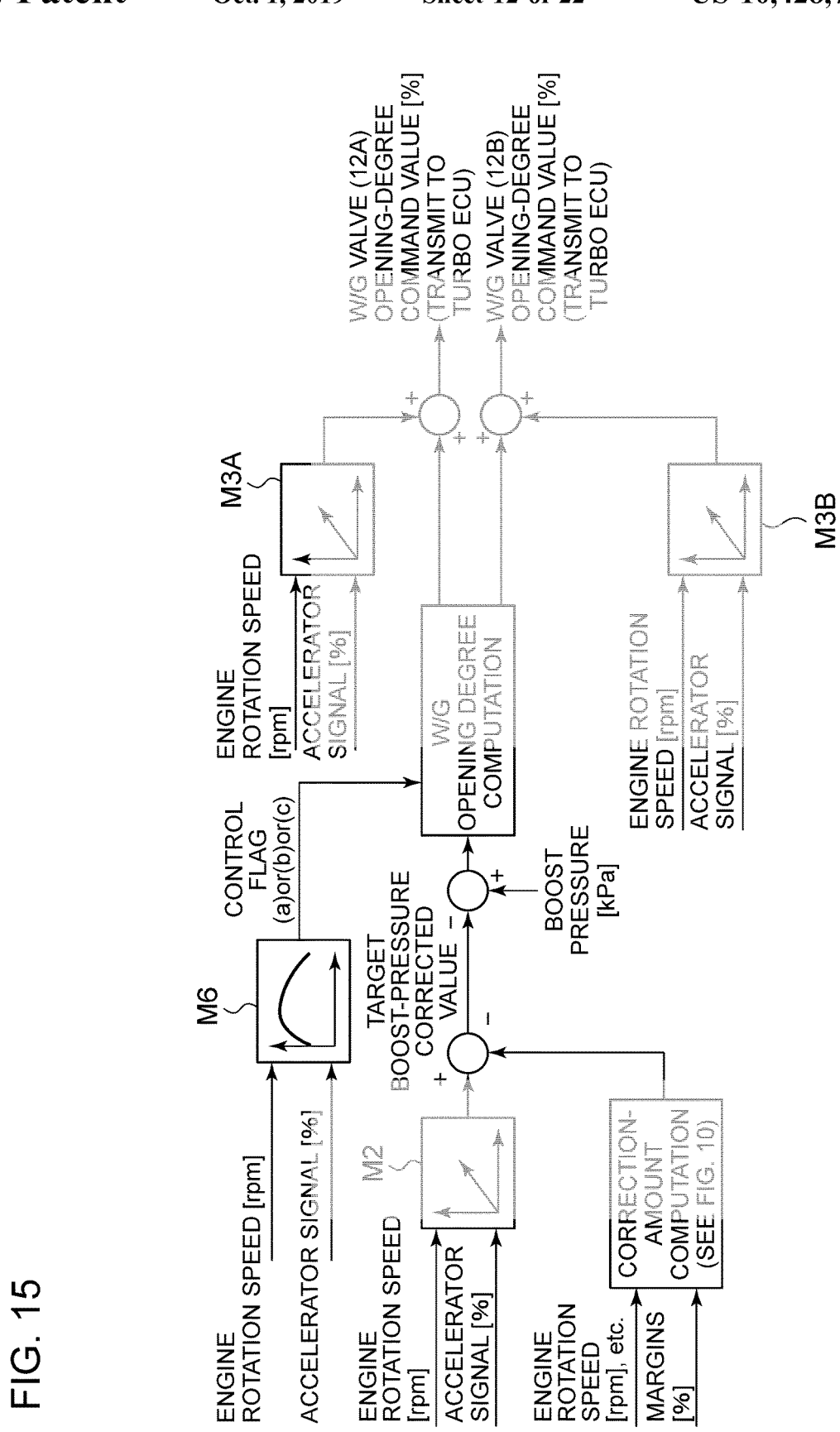
FIG. 15 is a diagram for describing computation logics for computing two W/G valve opening-degree command values.

FIG. 15 is a diagram for describing computation logics for computing two W/G valve opening-degree command values, corresponding to FIG. 8 of the first embodiment. As shown in FIG. 15, firstly, an engine rotation speed and an accelerator signal are inputted into the target boost-pressure map M2 to calculate a target boost pressure. Then, a correction amount computed on the basis of a margin or the like by the above-described method is subtracted from the calculated target boost pressure to calculate a target boost-pressure corrected value. A feedback control for a boost pressure detected by the pressure sensor 32 is performed to compute a W/G valve opening degree for a difference between a target boost-pressure corrected value and a boost pressure for each of the high-pressure stage waste-gate valve 12A and the low-pressure stage waste-gate valve 12B. Herein, an engine rotation speed and an accelerator signal are inputted into a control flag map M6 shown in FIG. 13 to determine which of the above operational regions (a), (b), and (c) corresponds to an operational state of the engine 6, and a result is outputted as a control flag. A W/G valve opening degree is computed in accordance with this control flag, so as to correspond to the content of a boost-pressure control in an operational state shown in FIG. 14. For instance, if a control flag (a) is outputted, the W/G valve opening degrees of the high-pressure stage waste-gate valve 12A and the low-pressure stage waste-gate valve 12B are computed to be fully closed. If a control flag (b) is outputted, the W/G valve opening degree of the low-pressure stage waste-gate valve 12B is computed to be fully closed, and the W/G valve opening degree of the high-pressure stage waste-gate valve 12A is computed so that the boost pressure of the high-pressure stage turbocharger 4A reaches the target boost pressure. If a control flag (c) is outputted, the W/G valve opening degree of the high-pressure stage waste-gate valve 12A is computed to be fully open, and the W/G valve opening degree of the low-pressure stage waste-gate valve 12B is computed so that the boost pressure of the high-pressure stage turbocharger 4A reaches the target boost pressure. To the computed W/G valve opening degrees, values calculated by inputting an engine rotation speed and an accelerator signal to W/G valve opening-degree maps M3A, M3B are added, and thereby a W/G valve opening-degree command value is calculated for each of the high-pressure stage waste-gate valve 12A and the low-pressure stage waste-gate valve 12B.

According to the present embodiment, in a two-stage supercharging system including the high-pressure stage turbocharger 4A and the low-pressure stage turbocharger 4B, the valve opening degree of the high-pressure stage waste-gate valve 12A being the boost-pressure control unit for the high-pressure stage turbocharger 4A and the valve opening degree of the low-pressure stage waste-gate valve 12B being the boost-pressure control unit for the low-pressure stage turbocharger 4B are adjusted, and thereby the boost pressures of the high-pressure stage turbocharger 4A and the low-pressure stage turbocharger 4B are controlled, which makes it possible to prevent occurrence of surging in advance while suppressing rapid fluctuation of the boost pressures.

Fourth Embodiment

Figure 16:
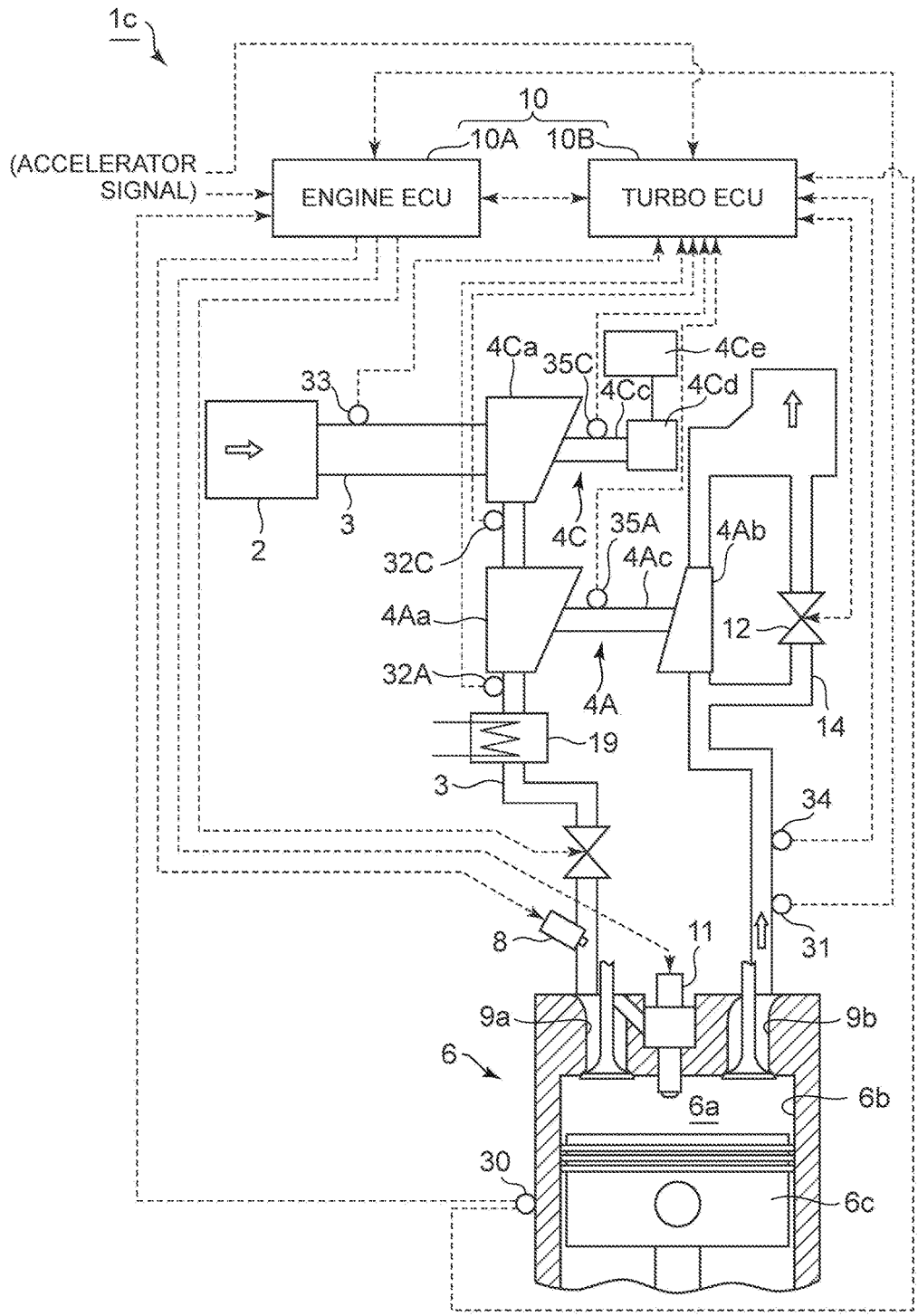
FIG. 16 is an overall configuration diagram of an engine system to which a control device of a supercharging system according to the fourth embodiment of the present invention is to be applied.

FIG. 16 is an overall configuration diagram of an engine system to which a control device of a supercharging system according to the fourth embodiment of the present invention is to be applied. The engine system 1c of the present embodiment is basically similar to the embodiment illustrated in FIG. 1 in terms of configuration, except for the two-stage turbo-charging system including two turbochargers, the turbocharger 4A and an electric turbocharger 4C. Thus, the same component is associated with the same reference numeral and not described in detail.

In the present embodiment, as illustrated in FIG. 16, a turbocharger for compressing intake air to be supplied to the engine 6 includes the turbocharger 4A and the electric turbocharger 4C. The turbocharger 4A includes the turbine 4Ab disposed in the exhaust duct 5 of the engine 6 and driven to rotate by exhaust energy from the engine 6, and the compressor 4Aa disposed in the intake duct 3 of the engine 6 and driven coaxially with the turbine 4Ab. The electric turbocharger 4C includes an electric compressor 4Ca disposed upstream of the compressor 4Aa of the turbocharger 4A, a motor 4Cd for driving the electric compressor 4Ca to rotate, and an inverter 4Ce (rotation-speed control unit) which controls a rotation speed of the motor 4Cd. The bypass channel 14 bypassing the turbine 4Ab is connected to the exhaust duct 5 of the engine 6, and the waste-gate valve 12 is disposed in the bypass channel 14. The boost pressure of the turbocharger 4A is controlled by adjusting the valve opening degree of the waste-gate valve 12. Further, the rotation speed of the motor 4Cd is controlled by the inverter 4Ce to control the boost pressure of the electric turbocharger 4C. That is, in the present embodiment, each of the waste-gate valve 12 and the inverter 4Ce corresponds to a boost-pressure control unit of the present invention.

Figure 17:
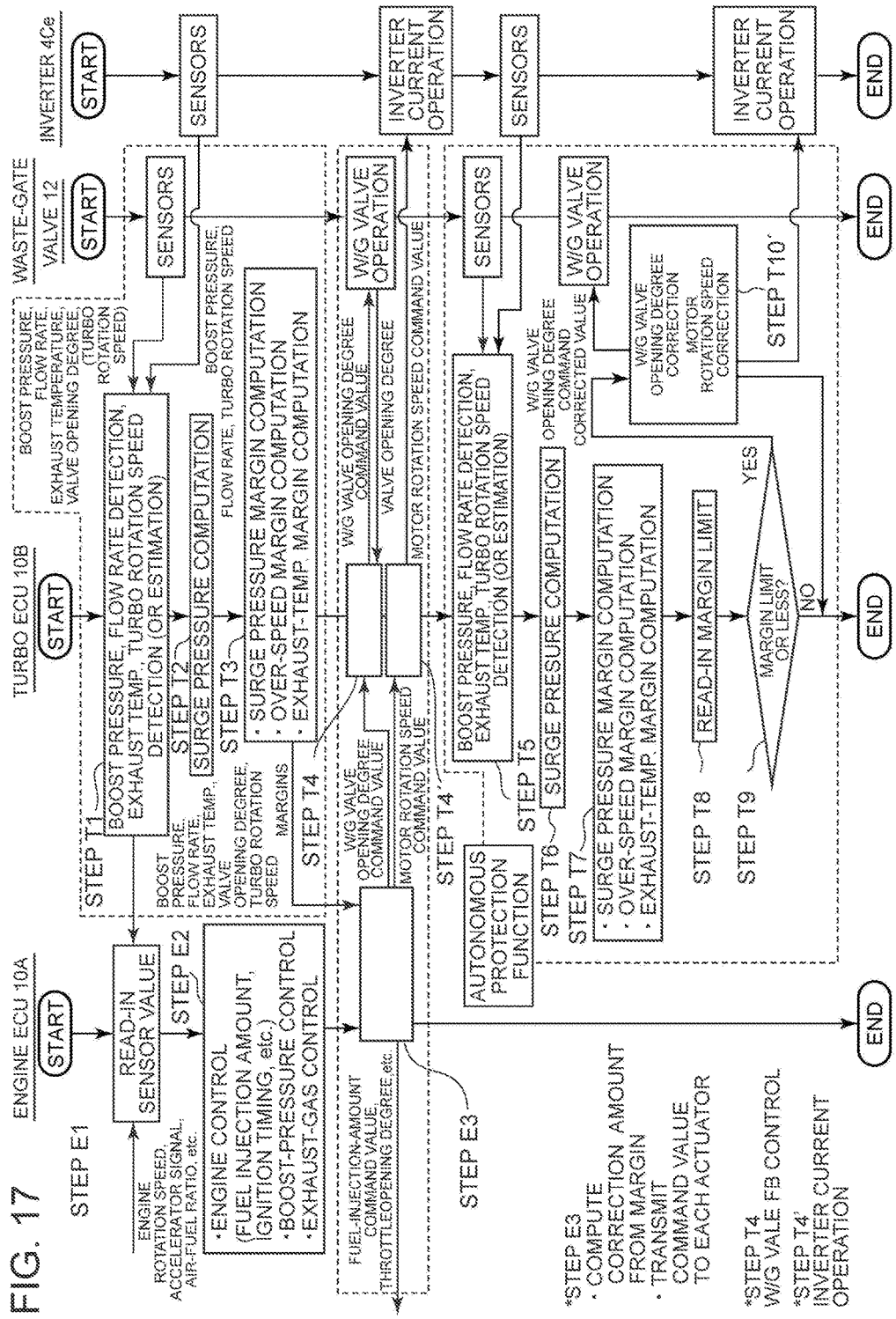
FIG. 17 is a control flowchart of a boost-pressure control unit according to the fourth embodiment.

FIG. 17 is a control flowchart of a boost-pressure control unit according to the fourth embodiment, corresponding to FIG. 4 of the first embodiment. Thus, the same component also shown in FIG. 4 is associated with the same reference numeral and not described in detail.

In the control flow of the present embodiment, in step E3, a motor rotation-speed command value, which is a control command value for the inverter 4Ce, is computed in addition to a W/G valve opening-degree command value (turbo control command value) for the waste-gate valve 12. The computed motor rotation-speed command value is outputted to the turbo ECU 10B, and the turbo ECU 10B controls the output of the inverter 4Ce (step T4'), which differentiates the present embodiment from the above described first embodiment.

Further, the margin re-computed in step T9 is compared with a margin limit, and if the recomputed margin is not greater than a margin limit, not only the W/G valve opening-degree command value but also the motor rotation-speed command value is corrected, and the corrected motor rotation-speed command corrected value is outputted to the inverter 4Ce (step T10'), which differentiates the present embodiment from the above described first embodiment.

According to the present embodiment, in a two-stage supercharging system including the turbocharger 4A and the electric turbocharger 4C, the valve opening degree of the waste-gate valve 12 being the boost-pressure control unit for the turbocharger 4A is adjusted, and the rotation speed of the motor 4Cd is controlled with the inverter 4Ce being the boost-pressure control unit for the electric turbocharger 4C, and thereby the boost pressure of each of the turbocharger 4A and the electric turbocharger 4C is controlled, which makes it possible to prevent occurrence of surging in advance while suppressing rapid fluctuation of the boost pressure. In the above embodiment, the electric turbocharger 4C is disposed on a low-pressure stage side. However, the positions of the turbocharger 4A and the electric turbocharger 4C may be switched so that the electric turbocharger 4C is disposed on a high-pressure stage side.

Fifth Embodiment

Figure 18:
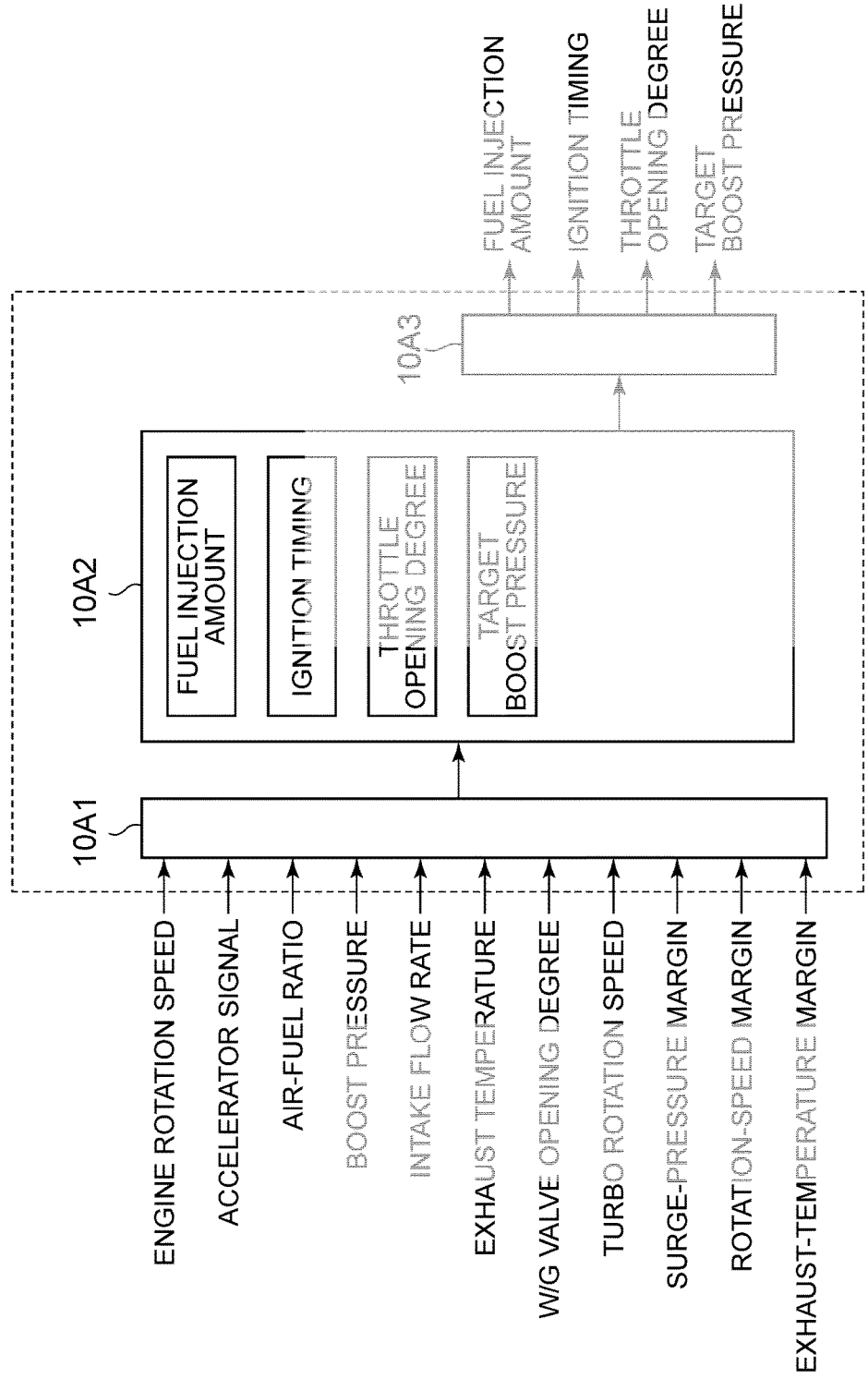
FIG. 18 is a block diagram for describing functions of an engine ECU according to the fifth embodiment.
Figure 19:
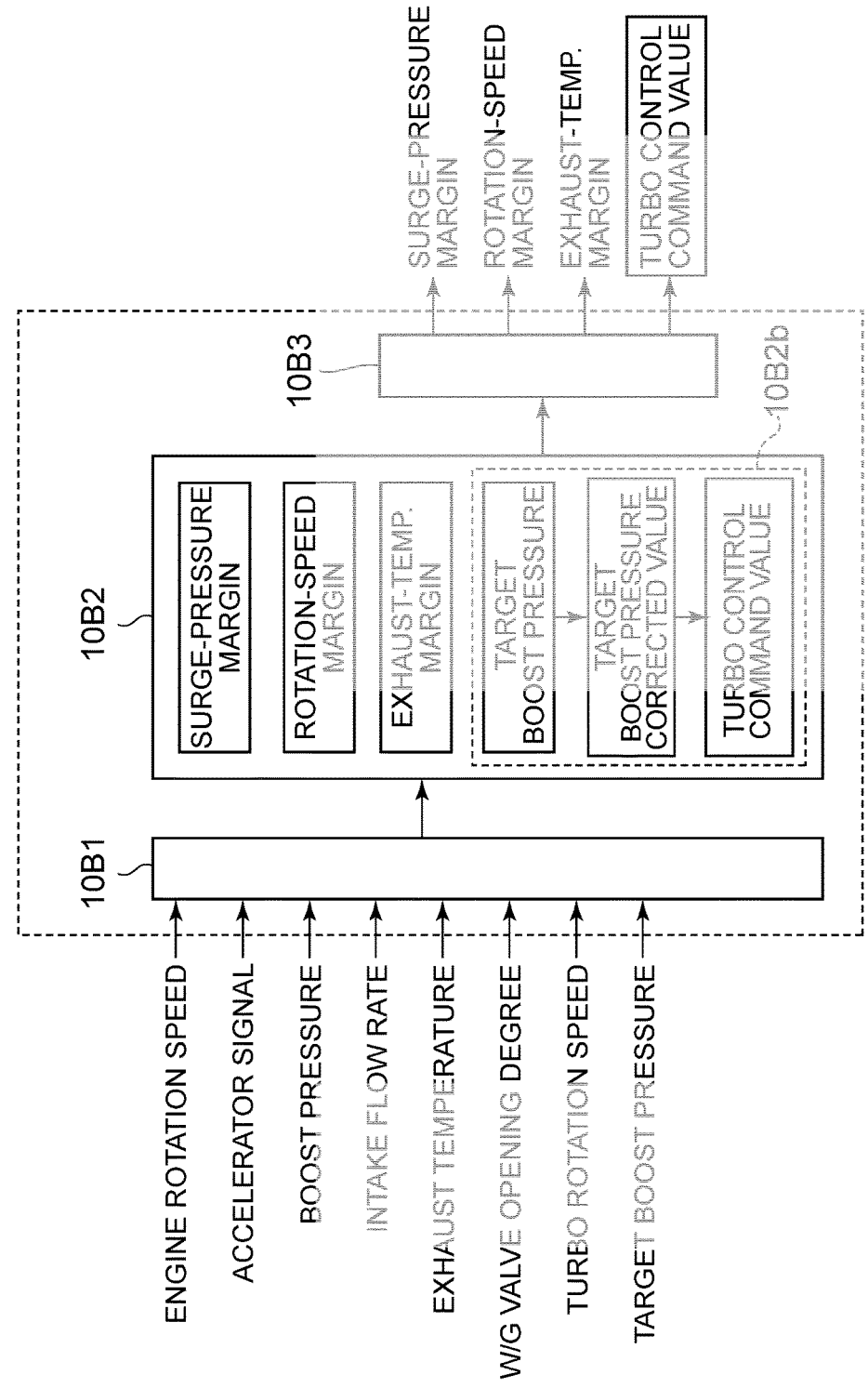
FIG. 19 is a block diagram for describing functions of a turbo ECU according to the fifth embodiment.

Next, the fifth embodiment of the present invention will be described with reference to FIGS. 18 to 21. FIG. 18 is a block diagram for describing functions of an engine ECU according to the fifth embodiment. FIG. 19 is a block diagram for describing functions of a turbo ECU according to the fifth embodiment. The overall configuration of an engine system according to the present embodiment is the same as that in the first embodiment depicted in FIG. 1, and thus not described again in detail.

The engine ECU 10A of the present embodiment is different from the first embodiment in that, as illustrated in FIG. 18, the engine control part 10A2 does not compute a W/G valve opening-degree command value (turbo control command value). In the present embodiment, the engine ECU 10A computes a target boost pressure, and the computed target boost pressure is outputted to the turbo ECU 10B. As illustrated in FIG. 19, the turbo ECU 10B corrects the target boost pressure on the basis of a margin computed by the turbo control part 10B2 to compute a target boost-pressure corrected value, and also computes a W/G valve opening-degree command value corresponding to the target boost-pressure corrected value. The computed W/G valve opening-degree command value (turbo control command value) is outputted to the waste-gate valve 12.

Figure 20:
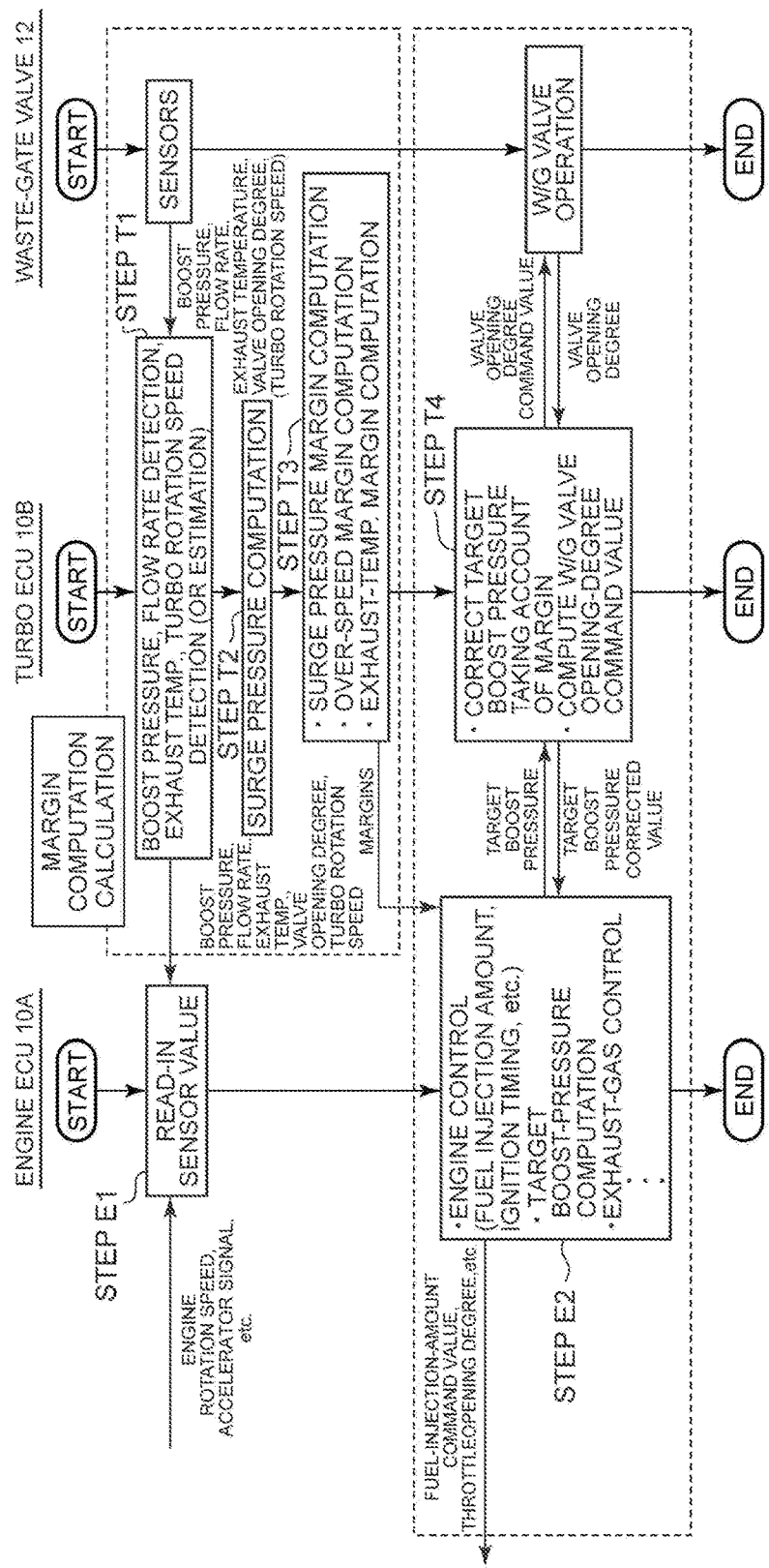
FIG. 20 is a control flowchart of a boost-pressure control unit according to the fifth embodiment.

FIG. 20 is a control flowchart of a boost-pressure control unit according to the fifth embodiment.

In the present embodiment, as illustrated in FIG. 20, the engine ECU 10A reads in the above described various sensor signals (step E1), and then computes control command values for the various devices, such as a fuel-injection amount, an ignition timing, a throttle opening, and a boost pressure, and also computes a target boost pressure (step E2). In parallel to the control by the engine ECU 10A, the turbo ECU 10B reads in the above described various sensor signals (step T1), computes a surge pressure (step T2), and computes a margin such as a surge pressure margin, a rotation-speed margin, and an exhaust-temperature margin (step T3). The turbo ECU 10B corrects the target boost pressure on the basis of a margin to compute a target boost-pressure corrected value, and also computes a W/G valve opening-degree command value corresponding to the target boost-pressure corrected value. The computed target boost-pressure corrected value is also outputted to the engine ECU 10A. The turbo ECU 10B performs a feedback control so as to match the valve opening degree of the waste-gate valve 12 to the W/G valve opening-degree command value (step T4).

Figure 21:
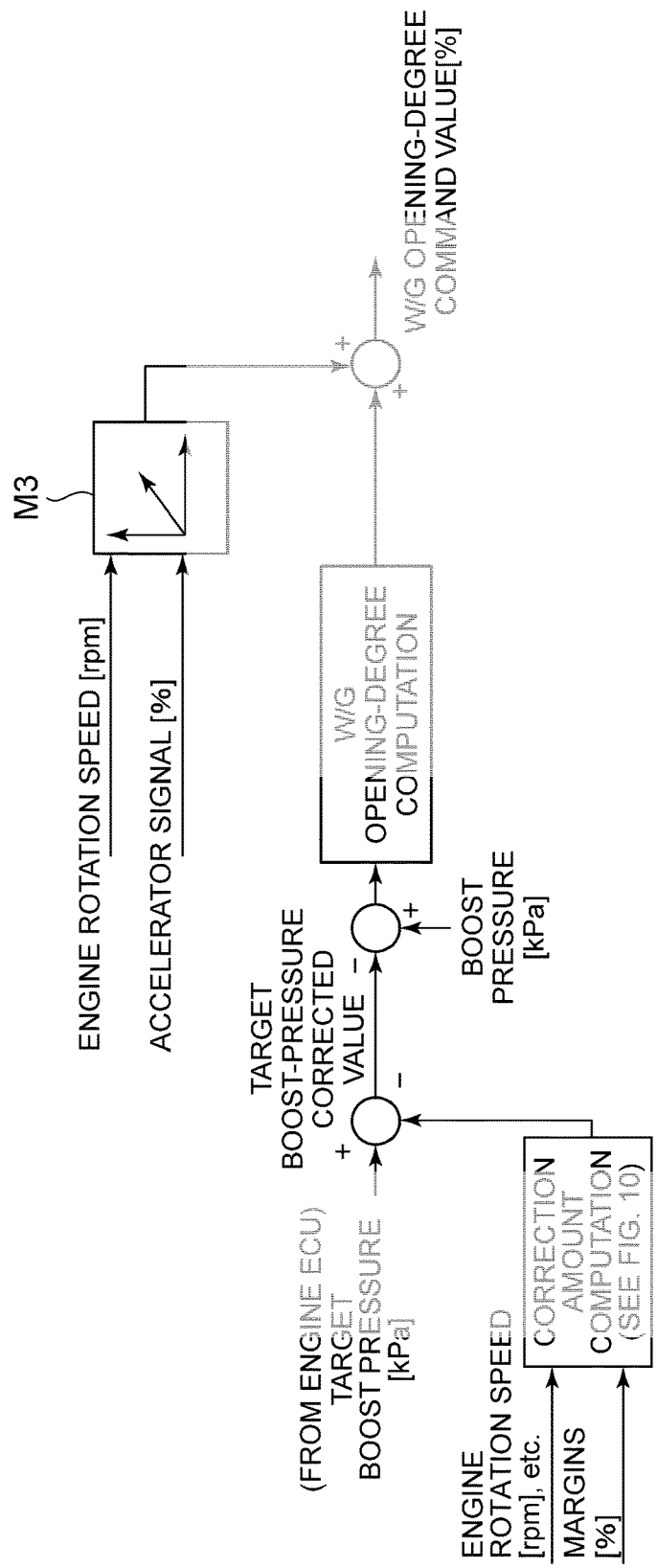
FIG. 21 is a diagram for describing computation logics for computing a W/G valve opening-degree command value.

FIG. 21 is a diagram for describing computation logics for computing a W/G valve opening-degree command value.

In the present embodiment, as illustrated in FIG. 21, to compute a W/G valve opening-degree command value, a correction amount computed on the basis of a margin or the like by the above-described method is subtracted from the target boost pressure computed by the engine ECU 10A to calculate a target boost-pressure corrected value. A feedback control for a boost pressure detected by the pressure sensor 32 is performed to compute a W/G valve opening degree for a difference between a target boost-pressure corrected value and a boost pressure. To the W/G valve opening degree, a value calculated by inputting an engine rotation speed and an accelerator signal to a W/G valve opening-degree map M3 is added, and thereby a W/G valve opening-degree command value is calculated. This computation is performed by a turbo control command value computation part 10B2b of the turbo control part 10B2 illustrated in FIG. 19.

According to this embodiment, basically, a target boost-pressure corrected value is computed by the turbo ECU 10B, and a W/G valve opening-degree command value (turbo control command value) corresponding to the target boost-pressure corrected value is computed, and the W/G valve opening-degree command value is outputted to the waste-gate valve 12. Specifically, the turbo ECU 10B itself performs the entire control of the boost-pressure control unit, and does not need to communicate with the engine ECU 10A, which makes it possible to control the boost-pressure control unit quickly while avoiding an influence from communication delay of the engine ECU 10A.

In the above embodiment, as illustrated in FIG. 20, the turbo ECU 10B outputs the computed target boost-pressure corrected value also to the engine ECU 10A.

According to this embodiment, the engine ECU 10A can reflect the target boost-pressure corrected value computed by the turbo ECU 10B to control the boost-pressure control unit from then on, or to control other devices.

Sixth Embodiment

Figure 22:
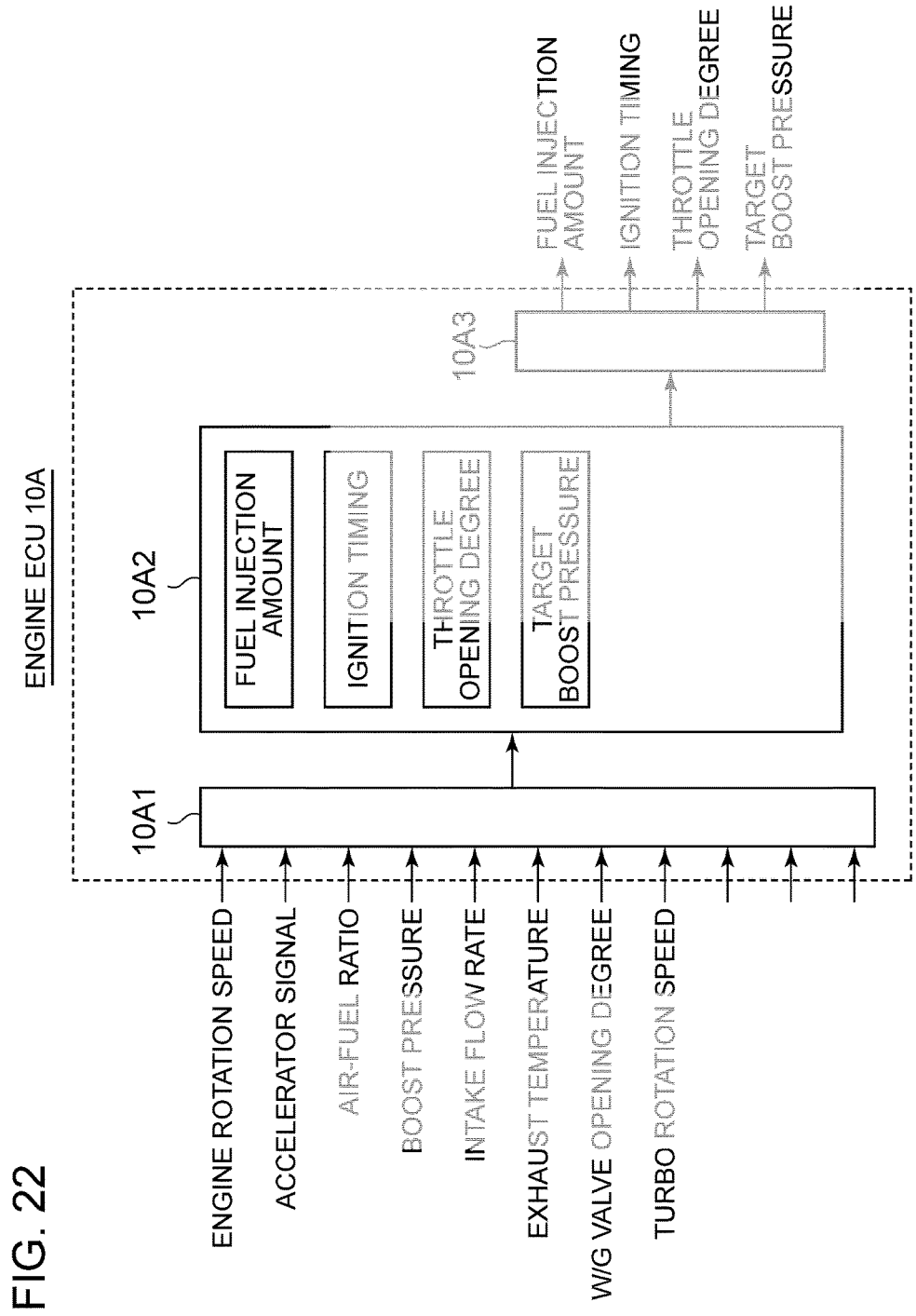
FIG. 22 is a block diagram for describing functions of an engine ECU according to the sixth embodiment.
Figure 23:
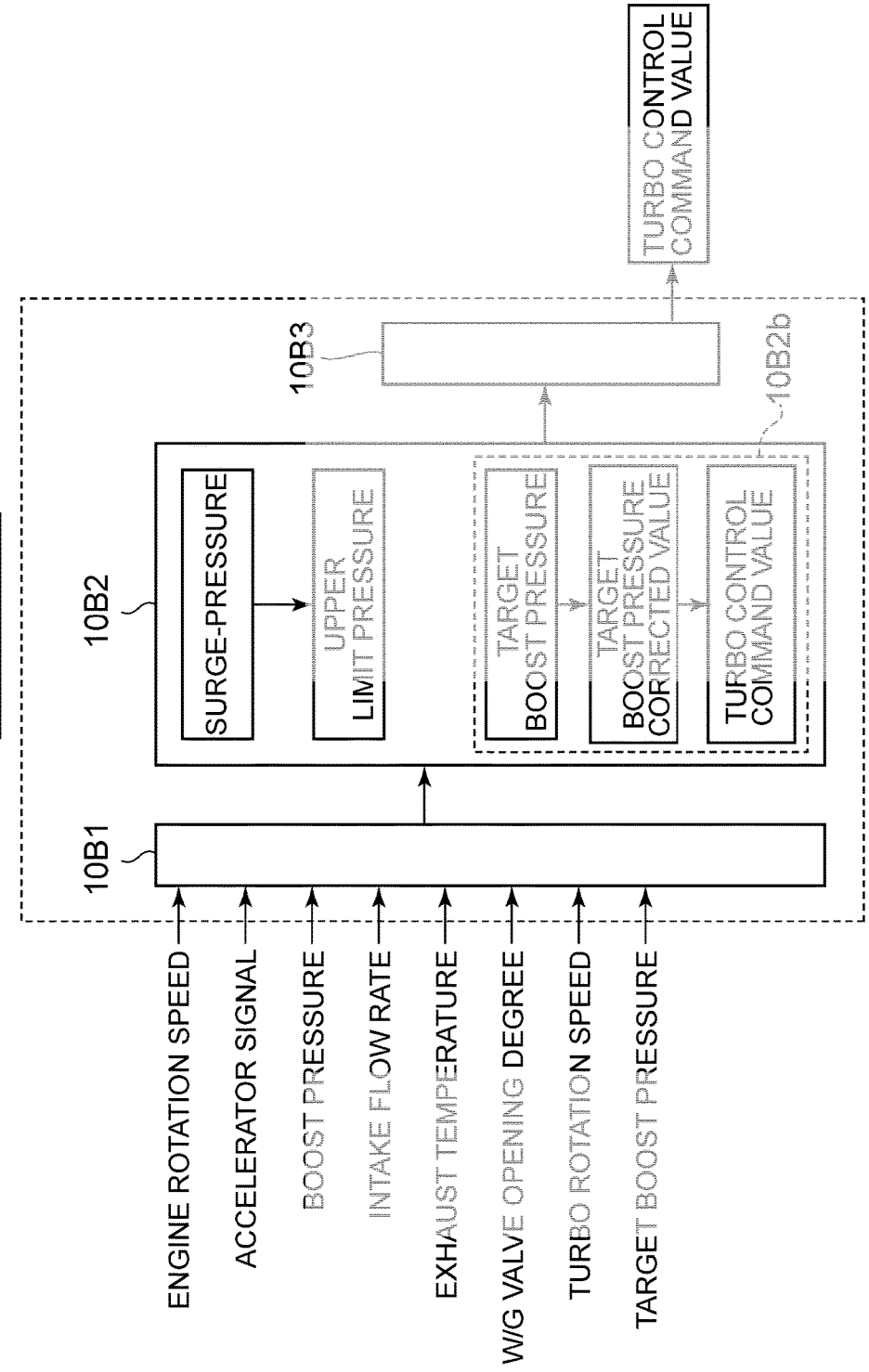
FIG. 23 is a block diagram for describing functions of a turbo ECU according to the sixth embodiment.

Next, the sixth embodiment of the present invention will be described with reference to FIGS. 22 to 25. FIG. 22 is a block diagram for describing functions of an engine ECU according to the sixth embodiment. FIG. 23 is a block diagram for describing functions of a turbo ECU according to the sixth embodiment. The overall configuration of an engine system according to the present embodiment is the same as that in the first embodiment depicted in FIG. 1, and thus not described again in detail.

The engine ECU 10A of the present embodiment is different from the first embodiment in that, as illustrated in FIG. 22, the engine control part 10A2 does not compute a W/G valve opening-degree command value (turbo control command value). In the present embodiment, the engine ECU 10A computes a target boost pressure, and the computed target boost pressure is outputted to the turbo ECU 10B. This is similar to the above described fifth embodiment.

In the present embodiment, as illustrated in FIG. 23, the turbo control part 10B2 does not compute a margin as described above. Instead, the turbo control part 10B2 computes a surge pressure which is a limit pressure at which surging occurs, on the basis of sensor signals such as a boost pressure and an intake flow rate inputted into the turbo signal input part 10131. A pressure value corresponding to a predetermined margin limit is subtracted from the computed surge pressure to calculate an upper limit pressure. The upper limit pressure and the target boost pressure are compared, and if the target boost pressure is larger than the upper limit pressure, the target boost pressure is corrected so as to obtain a target boost pressure corrected value equal to the upper limit pressure.

The margin limit is set as a constant value that does not change with time in accordance with a change in an operational state (engine rotation speed or accelerator signal) of the engine, such as 5%, 10%, and 15%. Thus, it is no longer necessary to compute a margin limit repetitively with time in accordance with a change in an operational state of the engine, unlike the above described embodiments. Thus, it is possible to simplify computation logics of the turbo controller 10B.

Figure 24:
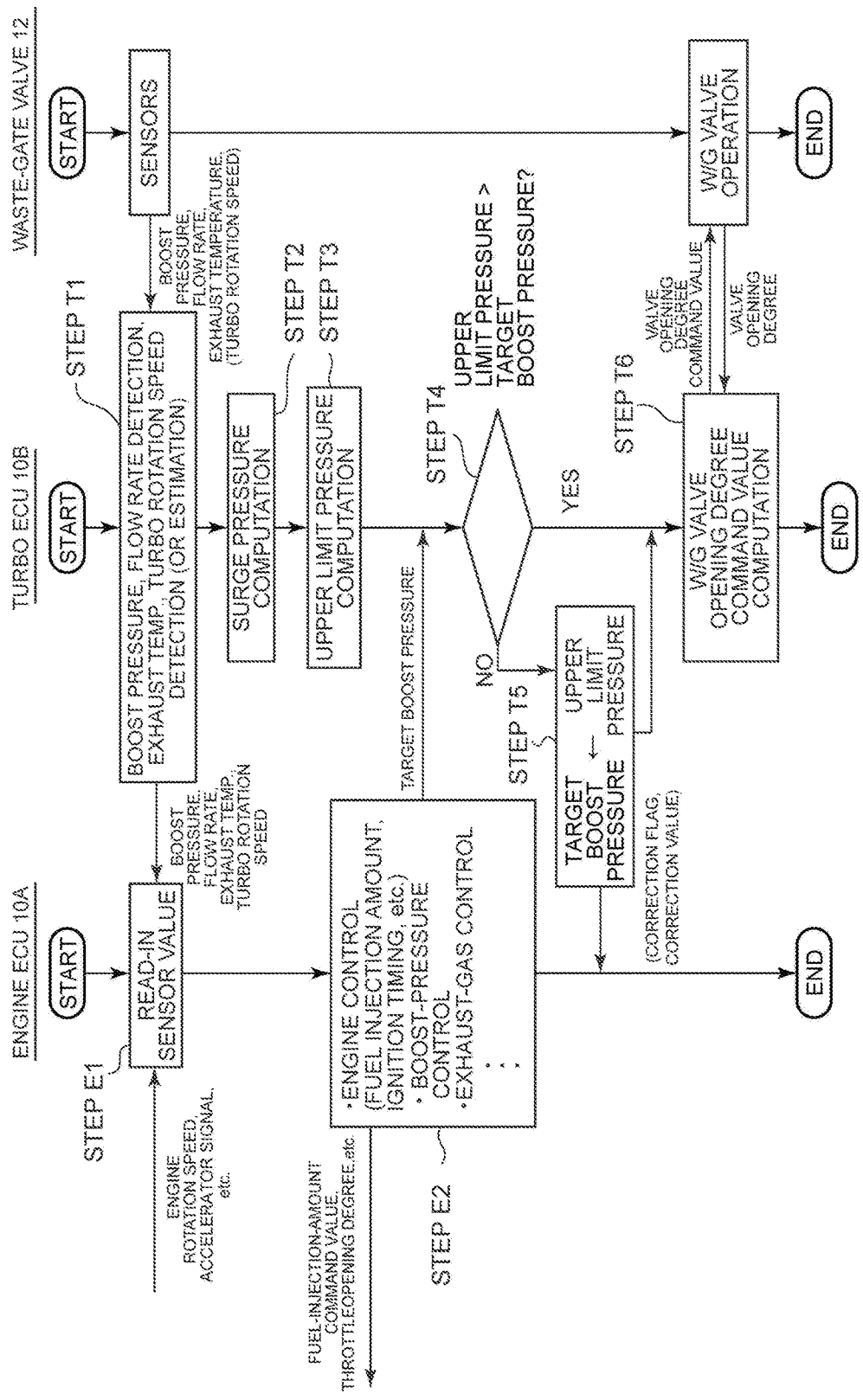
FIG. 24 is a control flowchart of a boost-pressure control unit according to the sixth embodiment.

FIG. 24 is a control flowchart of a boost-pressure control unit according to the sixth embodiment.

In the present embodiment, as illustrated in FIG. 24, the engine ECU 10A reads in the above described various sensor signals (step E1), and then computes control command values for the various devices, such as a fuel-injection amount, an ignition timing, a throttle opening, and a boost pressure, and also computes a target boost pressure (step E2). In parallel to this control by the engine ECU 10A, the turbo ECU 10B reads in the above described various sensor signals (step T1), computes a surge pressure (step T2), and computes an upper limit pressure from the surge pressure and a predetermined margin limit (step T3). The upper limit pressure and the target boost pressure are compared (step T4), and if the upper limit pressure is greater than the target boost pressure (YES in step T4), the target boost pressure is not corrected (i.e., "target boost pressure" is set to be equal to "target boost pressure corrected value"), and a W/G valve opening-degree command value corresponding to the target boost pressure corrected value (target boost pressure) is computed (step T6). If the upper limit pressure is not greater than the target boost pressure (NO in step T4), a target boost-pressure corrected value is computed so that the target boost-pressure corrected value equals to the upper limit pressure (step T5), and a W/G valve opening-degree command value corresponding to the target boost-pressure corrected value (upper limit pressure) is computed (step T6). Further, an indication (correction flag) of having corrected the target boost pressure for matching the target boost-pressure corrected value to the upper limit pressure and the target boost-pressure corrected value are transmitted to the engine ECU 10A.

Figure 25:
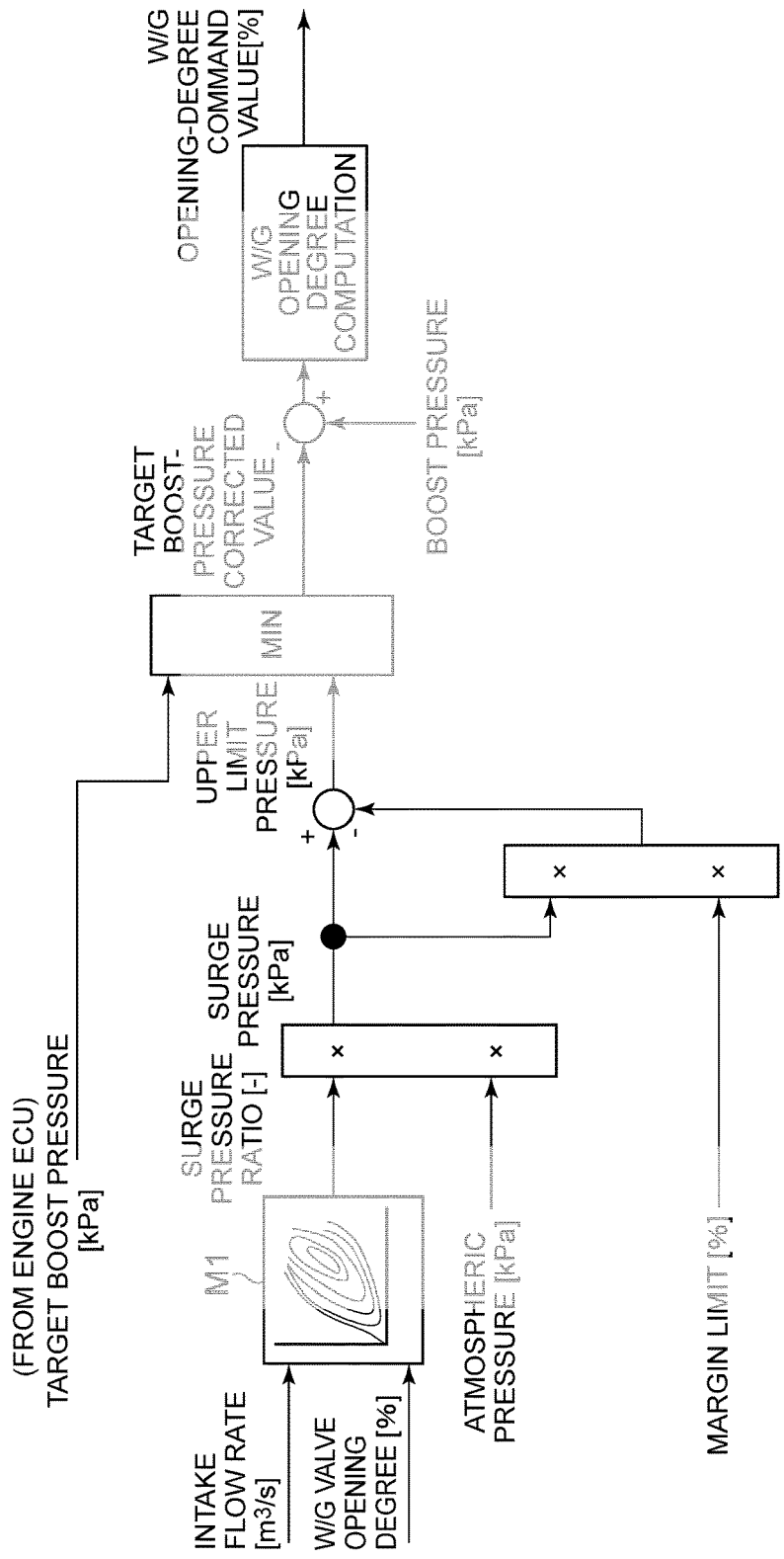
FIG. 25 is a diagram for describing computation logics for computing a W/G valve opening-degree command value.

FIG. 25 is a diagram for describing computation logics for computing a W/G valve opening-degree command value.

In the present embodiment, as illustrated in FIG. 25, to compute a W/G valve opening-degree command value, firstly, an intake flow rate and a W/G valve opening degree are inputted to a surge-pressure map M1 to calculate a surge pressure ratio, and the surge pressure ratio is multiplied by an atmospheric pressure to calculate a surge pressure. A pressure value corresponding to a predetermined margin limit is subtracted from the surge pressure to compute an upper limit pressure. Herein, a pressure value corresponding to a margin limit is calculated by multiplying the computed surge pressure by a margin limit. The accordingly calculated upper limit pressure and the target boost pressure computed by the engine ECU 10A are compared, and the smaller one is outputted as a target boost-pressure corrected value. A feedback control for a boost pressure detected by the pressure sensor 32 is performed to compute a W/G valve opening degree for a difference between a target boost-pressure corrected value and a boost pressure.

According to this embodiment, similarly to the above described fifth embodiment, a target boost-pressure corrected value is computed by the turbo ECU 10B, and a W/G valve opening-degree command value (turbo control command value) corresponding to the target boost-pressure corrected value is computed, and the W/G valve opening-degree command value is outputted to the waste-gate valve 12. Specifically, the turbo ECU 10B itself performs the entire control of the boost-pressure control unit, and does not need to communicate with the engine ECU 10A, which makes it possible to control the boost-pressure control unit quickly while avoiding an influence from communication delay of the engine ECU 10A.

Further, in the present embodiment, the upper limit pressure and the target boost pressure are compared, and if the target boost pressure is larger than the upper limit pressure, the target boost pressure is corrected so as to match the target boost pressure corrected value with the upper limit pressure, and thus the computation logics for correcting a target boost pressure are simple. Accordingly, it is possible to simplify the computation logics of the turbo controller 10B even compared to those in the fifth embodiment, and to compute a turbo control command value in an instant, which makes it possible to improve control responsiveness of a boost-pressure control unit such as the W/G valve and the VG actuator.

In some embodiments, the turbo controller 10B stores a plurality of margin limit values defined as constant values in advance. The plurality of margin limit values are each associated with corresponding one of a plurality of preset operation modes, and a margin limit corresponding to a selected operation mode is selected.

For instance, three margin limits are set in advance, including: the first margin limit (e.g. 10%) corresponding to a normal mode; the second margin limit (e.g. 5%) corresponding to a high-response mode and smaller than the first margin limit; and the third margin limit (e.g. 15%) corresponding to a safety mode and larger than the first margin limit. A margin limit corresponding to a selected operation mode may be selected in response to switching of the operation modes by a driver or the like.

According to this embodiment, it is possible to provide a variable margin limit without making the computation logics of the turbo controller 10B more complicated.

The embodiments of the present invention have been described above. However, the present invention is not limited thereto. For instance, various modifications may be applied as long as they do not depart from the object of the present invention.

INDUSTRIAL APPLICABILITY

At least one embodiment of the present invention can be suitably used as a control device for a supercharging system for supplying compressed intake air to an engine for an automobile, a ship, or an industrial use.

DESCRIPTION OF REFERENCE NUMERALS

1, 1*a*, 1*b*, 1*c* Engine system
2 Air cleaner
3 Intake duct
4 Turbocharger (supercharger)
4A High-pressure stage turbocharger (supercharger)
4B Low-pressure stage turbocharger (supercharger)

4C Electric turbocharger (supercharger)
4a, 4Aa, 4Ba Compressor
4Ca Electric compressor
4b, 4Ab, 4Bb Turbine
4Cd Motor
4Ce Inverter (rotation-speed control unit, boost-pressure control unit)
4c Rotor
4d Variable control mechanism (boost-pressure control unit)
5 Exhaust duct
6 Engine
6a Combustion chamber
6b Cylinder liner
6c Piston
7 Throttle valve
8 Injector
9a Intake port
9b Exhaust port
10 Control device
10A Engine ECU (engine controller)
10A1 Engine-signal input part
10A2 Engine control part
10A3 Engine-signal output part
10B Turbo ECU (turbo controller)
10B1 Turbo signal input part
10B2 Turbo control part
10B3 Turbo signal output part
11 Spark plug
12, 12A, 12B Waste-gate valve (boost-pressure control unit)
14 Bypass channel
14A High-pressure stage bypass channel
14B Low-pressure stage bypass channel
19 Intercooler
30 Rotation-speed sensor
31 Air-fuel ratio sensor
32 Pressure sensor
33 Air-flow meter
34 Exhaust-temperature sensor
35 Turbo rotation-speed sensor

The invention claimed is:

1. A control device for a supercharging system for supplying compressed intake air to an engine, the supercharging system comprising a supercharger configured to compress intake air to be supplied to the engine, a boost-pressure control unit configured to control a boost pressure of the supercharger, and the control device configured to control the boost-pressure control unit, the control device comprising:
an engine controller, including a first processor, and comprising an engine signal input part to which various sensor signals related to an operational state of the engine are to be inputted, and an engine control part configured to control an operational state of the engine and to compute a target boost pressure of the supercharger on the basis of the sensor signals inputted into the engine signal input part; and
a turbo controller, including a second processor separate from the first processor, and comprising a turbo signal input part to which at least sensor signals related to an operational state of the supercharger are to be inputted from among the various sensor signals related to an operational state of the engine, and a turbo control part configured to compute a margin of the supercharger on the basis of the sensor signals inputted to the turbo signal input part, and independently from the engine controller, the turbo controller comprising a control part and the turbo signal input part provided separately and independently from the engine control part and the engine signal input part, respectively, of the engine controller,
wherein one of the engine controller and the turbo controller is configured to compute a target boost-pressure corrected value by correcting the target boost pressure in accordance with a magnitude of the margin computed by the turbo control part, and to control the boost-pressure control unit so that the boost pressure of the supercharger reaches the target boost-pressure corrected value.

2. The control device for a supercharging system according to claim 1,
wherein the engine controller is configured to compute a turbo control command value corresponding to the target boost-pressure corrected value, and output the computed turbo control command value to the boost-pressure control unit via the turbo controller, and
wherein the turbo controller has an autonomous protection function to re-compute a margin of the supercharger on the basis of sensor signals related to an operational state of the supercharger after the boost-pressure control unit is controlled on the basis of the turbo control command value, correct the turbo control command value in accordance with a magnitude of the re-computed margin, and output the corrected turbo control command value to the boost-pressure control unit.

3. The control device for a supercharging system according to claim 2,
wherein the turbo controller is configured to output the corrected turbo control command value also to the engine controller when outputting the corrected turbo control command value to the boost-pressure control unit.

4. The control device for a supercharging system according to claim 1,
wherein the engine controller is configured to output the target boost pressure computed by the engine control part to the turbo controller, and
wherein the turbo controller is configured to compute a target boost-pressure corrected value by correcting the target boost pressure on the basis of the margin computed by the turbo control part, compute a turbo control command value corresponding to the target boost-pressure corrected value, and output the computed turbo control command value to the boost-pressure control unit.

5. The control device for a supercharging system according to claim 4,
wherein the turbo controller is configured to output the computed target boost-pressure corrected value also to the engine controller.

6. The control device for a supercharging system according to claim 1,
wherein the supercharger comprises a turbocharger comprising a turbine disposed in an exhaust duct of the engine and driven to rotate by exhaust energy of exhaust gas discharged from the engine, and a compressor disposed in an intake duct of the engine and driven to rotate coaxially with the turbine, and
wherein a bypass channel bypassing the turbine is connected to the exhaust duct of the engine, a waste-gate valve is disposed in the bypass channel, and the boost pressure of the supercharger is controlled by adjusting a valve opening degree of the waste-gate valve.

7. The control device for a supercharging system according to claim 1,
wherein the supercharger comprises a variable turbocharger comprising a turbine driven to rotate by exhaust energy of exhaust gas discharged from the engine, a compressor driven to rotate coaxially with the turbine, and a variable control mechanism configured to control a flow of the exhaust gas flowing into the turbine, and
wherein the boost pressure of the supercharger is controlled by controlling the flow of the exhaust gas flowing into the turbine by adjusting the variable control mechanism.

8. The control device for a supercharging system according to claim 1,
wherein the supercharger comprises:
a high-pressure stage turbocharger comprising a high-pressure stage turbine disposed in an exhaust duct of the engine and driven to rotate by exhaust energy of exhaust gas discharged from the engine, and a high-pressure stage compressor disposed in an intake duct of the engine and driven to rotate coaxially with the high-pressure stage turbine; and
a low-pressure stage turbocharger comprising a low-pressure stage turbine disposed in the exhaust duct at a downstream side of the high-pressure stage turbine, and a low-pressure stage compressor disposed in the intake duct at an upstream side of the high-pressure stage compressor and driven to rotate coaxially with the low-pressure stage turbine,
wherein a high-pressure stage bypass channel bypassing the high-pressure stage turbine and a low-pressure stage bypass channel bypassing the low-pressure stage turbine are connected to the exhaust duct of the engine, a high-pressure stage waste-gate valve is disposed in the high-pressure stage bypass channel, and a low-pressure stage waste-gate valve is disposed in the low-pressure stage bypass channel, and
wherein boost pressures of the high-pressure stage turbocharger and the low-pressure stage turbocharger are controlled individually by adjusting respective valve opening degrees of the high-pressure stage waste-gate valve and the low-pressure stage waste-gate valve.

9. The control device for a supercharging system according to claim 1,
wherein the supercharger comprises:
a turbocharger comprising a turbine disposed in an exhaust duct of the engine and driven to rotate by exhaust energy of exhaust gas discharged from the engine, and a compressor disposed in an intake duct of the engine and driven to rotate coaxially with the turbine; and
an electric turbocharger comprising an electric compressor disposed upstream or downstream of the compressor of the turbocharger, a motor configured to drive the electric compressor to rotate, and a rotation-speed control unit configured to control a rotation speed of the motor,
wherein a bypass channel bypassing the turbine is connected to the exhaust duct of the engine, and a waste-gate valve is disposed in the bypass channel, and
wherein the boost pressure of the turbocharger is controlled by adjusting a valve opening degree of the waste-gate valve, and a boost pressure of the electric turbocharger is controlled by controlling the rotation speed of the motor with the rotation-speed control unit.

10. A control device for a supercharging system for supplying compressed intake air to an engine, the supercharging system comprising a supercharger configured to compress intake air to be supplied to the engine, a boost-pressure control unit configured to control a boost pressure of the supercharger, and the control device configured to control the boost-pressure control unit, the control device comprising:
an engine controller comprising an engine signal input part to which various sensor signals related to an operational state of the engine are to be inputted, and an engine control part configured to control an operational state of the engine and to compute a target boost pressure of the supercharger on the basis of the sensor signals inputted into the engine signal input part; and
a turbo controller comprising a turbo signal input part to which at least sensor signals related to an operational state of the supercharger are to be inputted from among the various sensor signals related to an operational state of the engine, and a turbo control part configured to compute a margin of the supercharger on the basis of the sensor signals inputted to the turbo signal input part, the turbo controller comprising a control part and a signal input part provided separately and independently from the engine controller,
wherein one of the engine controller and the turbo controller is configured to compute a target boost-pressure corrected value by correcting the target boost pressure in accordance with a magnitude of the margin computed by the turbo control part, and to control the boost-pressure control unit so that the boost pressure of the supercharger reaches the target boost-pressure corrected value, and
wherein the margin includes a surge-pressure margin which is a ratio of a difference between a surge pressure and a boost pressure to the surge pressure, where the surge pressure is a limit pressure at which surging occurs.

11. The control device for a supercharging system according to claim 10,
wherein the margin further includes a rotation-speed margin, the rotation-speed margin being defined as the smaller one of:
a maximum allowable rotation-speed margin which is a ratio of a difference between a maximum allowable rotation speed of the supercharger and a rotation speed of the supercharger to the maximum allowable rotation speed; or
a steady rotation-speed allowable time margin which is a ratio of a difference between a maximum allowable duration and an elapsed time of continuous excess over a steady allowable rotation speed to the maximum allowable duration, where the steady allowable rotation speed is a rotation speed of the supercharger set to be lower than the maximum allowable rotation speed, and the maximum allowable duration is a limit length of time for which the rotation speed of the supercharger is allowed to exceed the steady allowable rotation speed continuously.

12. A control device for a supercharging system for supplying compressed intake air to an engine, the supercharging system comprising a supercharger configured to compress intake air to be supplied to the engine, a boost-pressure control unit configured to control a boost pressure of the supercharger, and the control device configured to control the boost-pressure control unit, the control device comprising:

an engine controller comprising an engine signal input part to which various sensor signals related to an operational state of the engine are to be inputted, and an engine control part configured to control an operational state of the engine and to compute a target boost pressure of the supercharger on the basis of the sensor signals inputted into the engine signal input part; and a turbo controller comprising a turbo signal input part to which at least sensor signals related to an operational state of the supercharger are to be inputted from among the various sensor signals related to an operational state of the engine, and a turbo control part configured to compute a margin of the supercharger on the basis of the sensor signals inputted to the turbo signal input part, the turbo controller comprising a control part and a signal input part provided separately and independently from the engine controller, wherein one of the engine controller and the turbo controller is configured to compute a target boost-pressure corrected value by correcting the target boost pressure in accordance with a magnitude of the margin computed by the turbo control part, and to control the boost-pressure control unit so that the boost pressure of the supercharger reaches the target boost-pressure corrected value, and wherein the engine controller is configured to correct a fuel injection amount computed on the basis of the sensor signals inputted to the engine signal input part in accordance with a magnitude of an exhaust-temperature margin defined as the smaller one of:

a maximum allowable temperature margin which is a ratio of a difference between a maximum allowable temperature of the supercharger and a temperature of exhaust gas flowing through an exhaust duct of the engine to the maximum allowable temperature; or a steady temperature allowable time margin which is a ratio of a difference between a maximum allowable duration and an elapsed time of continuous excess over a steady allowable temperature to the maximum allowable duration, where the steady allowable temperature is a temperature of the supercharger set to be lower than the maximum allowable temperature, and the maximum allowable duration is a limit length of time for which the temperature of the exhaust gas is allowed to exceed the steady allowable temperature continuously.

13. A control device for a supercharging system for supplying compressed intake air to an engine, the supercharging system comprising a supercharger configured to compress intake air to be supplied to the engine, a boost-pressure control unit configured to control a boost pressure of the supercharger, and the control device configured to control the boost-pressure control unit, the control device comprising:

an engine controller comprising an engine signal input part to which various sensor signals related to an operational state of the engine are to be inputted, an engine control part configured to control an operational state of the engine and to compute a target boost pressure of the supercharger on the basis of the sensor signals inputted into the engine signal input part, and an engine signal output part configured to output the target boost pressure computed by the engine control part; and a turbo controller comprising a turbo signal input part to which at least sensor signals related to an operational state of the supercharger from among the various sensor signals related to an operational state of the engine and the target boost pressure are to be inputted, and a turbo-control part configured to compute a target boost-pressure corrected value by correcting the target boost pressure inputted to the turbo signal input part and compute a turbo control command value corresponding to the target boost-pressure corrected value, and a turbo signal output part configured to output the turbo control command value computed by the turbo control part to the boost-pressure control unit, the turbo controller comprising a control part and a signal input-output part provided separately and independently from the engine controller, wherein the turbo control part is configured to compute a surge pressure which is a limit pressure at which surging occurs, on the basis of the sensor signals inputted to the turbo signal input part, compute an upper-limit pressure by subtracting a pressure value corresponding to a margin limit value defined in advance as a constant value from the computed surge pressure, and compare the upper-limit pressure with the target boost pressure and correct the target boost pressure so that the target boost-pressure corrected value coincides with the upper-limit pressure if the target boost pressure is larger than the upper-limit pressure.

* * * * *